(12) United States Patent
Katsurahara

(10) Patent No.: US 9,920,702 B2
(45) Date of Patent: Mar. 20, 2018

(54) FUEL INJECTION SYSTEM OF INTERNAL COMBUSTION ENGINE

(71) Applicant: DENSO CORPORATION, Kariya, Aichi-pref. (JP)

(72) Inventor: Hiroshi Katsurahara, Kariya (JP)

(73) Assignee: DENSO CORPORATION, Kariya (JP)

( * ) Notice: Subject to any disclaimer, the term of this patent is extended or adjusted under 35 U.S.C. 154(b) by 161 days.

(21) Appl. No.: 15/027,330

(22) PCT Filed: Oct. 7, 2014

(86) PCT No.: PCT/JP2014/005099
§ 371 (c)(1),
(2) Date: Apr. 5, 2016

(87) PCT Pub. No.: WO2015/052918
PCT Pub. Date: Apr. 16, 2015

(65) Prior Publication Data
US 2016/0252037 A1   Sep. 1, 2016

(30) Foreign Application Priority Data

Oct. 11, 2013 (JP) ................................. 2013-214127

(51) Int. Cl.
*F02D 41/24* (2006.01)
*F02D 41/20* (2006.01)
(Continued)

(52) U.S. Cl.
CPC ..... *F02D 41/2467* (2013.01); *F02D 41/1402* (2013.01); *F02D 41/20* (2013.01);
(Continued)

(58) Field of Classification Search
CPC ............ F02D 41/1402; F02D 41/2467; F02D 2041/1432; F02D 2041/2051; F02D 2041/2055
See application file for complete search history.

(56) References Cited

U.S. PATENT DOCUMENTS 8,170,775 B2 * 5/2012 Hori .................... F02D 41/0025
                                                              123/198 A
9,732,694 B2 * 8/2017 Mori .................... F02D 41/3082
(Continued)

FOREIGN PATENT DOCUMENTS

JP   2010-73705     4/2010
JP   2010-532448    10/2010

OTHER PUBLICATIONS

Katsurahara et al., U.S. Appl. No. 15/027,334, filed Apr. 5, 2016.
(Continued)

*Primary Examiner* — Sizo Vilakazi
*Assistant Examiner* — Kevin R Steckbauer
(74) *Attorney, Agent, or Firm* — Nixon & Vanderhye P.C.

(57) ABSTRACT

After off of an injection pulse of partial lift injection, a first filtered voltage Vsm1 being a negative terminal voltage of a fuel injection valve filtered by a first low-pass filter and a second filtered voltage Vsm2 being the negative terminal voltage of the fuel injection valve filtered by a second low-pass filter are calculated, and time from a predetermined reference timing to a timing when a difference Vdiff (=Vsm1−Vsm2) between the filtered voltages has an inflection point is calculated as voltage inflection time Tdiff. An averaged value Tdiff.ave of a predetermined frequency of data of the voltage inflection time Tdiff is obtained as a learning value of the voltage inflection time, and the injection pulse of the partial lift injection is corrected based on the learning value Tdiff.ave of the voltage inflection time.

10 Claims, 19 Drawing Sheets

(51) Int. Cl.
*F02D 41/22* (2006.01)
*F02M 65/00* (2006.01)
*F02D 41/34* (2006.01)
*F02D 41/14* (2006.01)

(52) U.S. Cl.
CPC ......... *F02D 41/221* (2013.01); *F02D 41/345* (2013.01); *F02M 65/005* (2013.01); *F02D 2041/1432* (2013.01); *F02D 2041/2051* (2013.01); *F02D 2041/2055* (2013.01); *F02D 2041/2058* (2013.01); *F02D 2200/0614* (2013.01); *F02D 2200/0616* (2013.01); *Y02T 10/44* (2013.01)

(56) References Cited

U.S. PATENT DOCUMENTS

| | | | |
|---|---|---|---|
| 9,765,725 B2* | 9/2017 | Nieddu | F02D 41/3809 |
| 2003/0071613 A1 | 4/2003 | Schultz et al. | |
| 2010/0224175 A1* | 9/2010 | Hori | F02D 41/0025 123/674 |
| 2016/0177855 A1* | 6/2016 | Kusakabe | F02D 41/20 123/490 |
| 2016/0237937 A1* | 8/2016 | Kusakabe | F02D 41/20 |
| 2016/0245211 A1* | 8/2016 | Katsurahara | F02D 41/20 |
| 2016/0252035 A1* | 9/2016 | Katsurahara | F02D 41/20 123/478 |
| 2017/0002765 A1* | 1/2017 | Nakano | F02D 41/34 |

OTHER PUBLICATIONS

Katsurahara et al., U.S. Appl. No. 15/027,335, filed Apr. 5, 2016.

* cited by examiner

FUEL INJECTION SYSTEM OF INTERNAL COMBUSTION ENGINE

CROSS REFERENCE TO RELATED APPLICATION

This application is the U.S. national phase of International Application No. PCT/JP2014/005099 filed on Oct. 7, 2014 which designated the U.S. and claims priority to Japanese Patent Application No. 2013-214127 filed on Oct. 11, 2013, the entire contents of each of which are incorporated herein by reference.

TECHNICAL FIELD

The present disclosure relates to a fuel injection control system of an internal combustion engine having an electromagnetic driving fuel injection valve.

BACKGROUND ART

Generally, a fuel injection control system of an internal combustion engine includes an electromagnetic driving fuel injection valve, and calculates a required injection quantity in correspondence to an operation state of the internal combustion engine, and drives the fuel injection valve to open with an injection pulse having a width corresponding to the required injection quantity so that fuel corresponding to the required injection quantity is injected.

For a fuel injection valve of an in-cylinder injection type internal combustion engine injecting high-pressure fuel into a cylinder, however, as illustrated in FIG. 5, linearity of a variation characteristic of an actual injection quantity relative to an injection pulse width tends to be reduced in a partial lift region (a region of a partial lift state, or a region of a short injection pulse width allowing a lift amount of a valve element not to reach a full lift position). In the partial lift region, the lift amount of the valve element (for example, a needle valve) tends to greatly vary, leading to a large variation in injection quantity. Such a large variation in injection quantity may degrade exhaust emission or drivability.

An existing technique on correction of a variation in injection quantity of the fuel injection valve includes, for example, a technique described in Patent Literature 1 (US-2003/0071613 A1), in which a drive voltage UM of a solenoid is compared to a reference voltage UR being the drive voltage UM filtered by a low-pass filter, and an armature position of the solenoid is detected based on an intersection of the two voltages.

In the technique of Patent Literature 1, however, the unfiltered drive voltage UM (raw value) is compared to the filtered reference voltage UR: hence, the intersection of the two voltages may not be accurately detected due to influence of noise superimposed on the unfiltered drive voltage UM. In addition, the intersection of the drive voltage UM and the reference voltage UR may not exist depending on characteristics of the solenoid. It is therefore difficult to accurately detect the armature position of the solenoid. Hence, the technique of Patent Literature 1 cannot accurately correct the variation in the injection quantity of the fuel injection valve due to the variation in the lift amount in the partial lift region.

PRIOR ART LITERATURES

Patent Literature

[Patent Literature 1] US-2003/0071613 A1

SUMMARY OF INVENTION

It is an object of the present disclosure to provide a fuel injection control system of an internal combustion engine, which accurately corrects the variation in injection quantity of the fuel injection valve due to the variation in lift amount in the partial lift region, leading to improvement in control accuracy of the injection quantity in the partial lift region.

According to an embodiment of the present disclosure, there is provided a fuel injection control system of an internal combustion engine having an electromagnetic driving fuel injection valve, the fuel injection control system including: an injection control means that performs partial lift injection to drive a fuel injection valve to open with an injection pulse allowing a lift amount of a valve element of the fuel injection valve not to reach a full lift position; a filtered-voltage acquisition means that, after off of an injection pulse of the partial lift injection, acquires a first filtered voltage being a terminal voltage of the fuel injection valve filtered by a first low-pass filter having a first frequency as a cutoff frequency, the first frequency being lower than a frequency of a noise component, and acquires a second filtered voltage being the terminal voltage filtered by a second low-pass filter having a second frequency as a cutoff frequency, the second frequency being lower than the first frequency; a difference calculation means that calculates a difference between the first filtered voltage and the second filtered voltage; a time calculation means that calculates time from a predetermined reference timing to a timing when the difference has an inflection point as voltage inflection time; a learning means that obtains an averaged value of a predetermined frequency of data of the voltage inflection time as a learning value of the voltage inflection time; and an injection pulse correction means that corrects the injection pulse of the partial lift injection based on the learning value of the voltage inflection time.

A terminal voltage (for example, a negative terminal voltage) of the fuel injection valve is varied by induced electromotive force after off of the injection pulse (see FIG. 12). At this time, when the fuel injection valve is closed, shift speed of the valve element (shift speed of a movable core) varies relatively greatly, and thus a variation characteristic of the terminal voltage is varied. This results in such a voltage inflection point that the variation characteristic of the terminal voltage is varied near valve-closing timing.

Focusing on such a characteristic, in the disclosure, after off of the injection pulse of the partial lift injection, the first filtered voltage being the terminal voltage filtered (moderated) by the first low-pass filter having the first frequency as a cutoff frequency, the first frequency being lower than a frequency of a noise component, is acquired, and the second filtered voltage being the terminal voltage filtered (moderated) by the second low-pass filter having the second frequency as a cutoff frequency, the second frequency being lower than the first frequency, is acquired. Consequently, it is possible to acquire the first filtered voltage being the terminal voltage from which a noise component is removed and the second filtered voltage for voltage inflection detection.

Furthermore, the difference between the first filtered voltage and the second filtered voltage is calculated, and the time from the predetermined reference timing to the timing when the difference has an inflection point is calculated as the voltage inflection time. Consequently, it is possible to accurately calculate the voltage inflection time that varies depending on the valve-closing timing of the fuel injection valve.

In the partial lift region of the fuel injection valve, as illustrated in FIG. 6, a variation in lift amount causes variations in injection quantity and in valve-closing timing, leading to a correlation between the injection quantity of the fuel injection valve and the valve-closing timing. Furthermore, the voltage inflection time varies depending on valve-closing timing of the fuel injection valve, leading to a correlation between the voltage inflection time and the injection quantity as illustrated in FIG. 7.

Focusing on such relationships, the injection pulse of the partial lift injection is corrected based on the voltage inflection time, thereby the injection pulse of the partial lift injection can be accurately corrected. Consequently, it is possible to accurately correct the variation in injection quantity due to the variation in lift amount in the partial lift region, leading to improvement in control accuracy of the injection quantity in the partial lift region.

Here, in the disclosure, an averaged value of a predetermined frequency of data of the voltage inflection time is obtained as a learning value of the voltage inflection time, and the injection pulse of the partial lift injection is corrected based on the learning value of the voltage inflection time. Consequently, it is possible to reduce influence of a noise component contained in the calculated value of the voltage inflection time, and improve accuracy of correction of the injection pulse based on the voltage inflection time.

BRIEF DESCRIPTION OF DRAWINGS

The above-described objects, other objects, features, and advantages of the present disclosure will be more clarified from the following detailed description with reference to the accompanying drawings.

EMBODIMENTS FOR CARRYING OUT INVENTION

Some embodiments embodying modes for carrying out the disclosure are now described.

First Embodiment

Referring to FIG. 1 to FIG. 12, a first embodiment of the present disclosure will be described.

Figure 1:
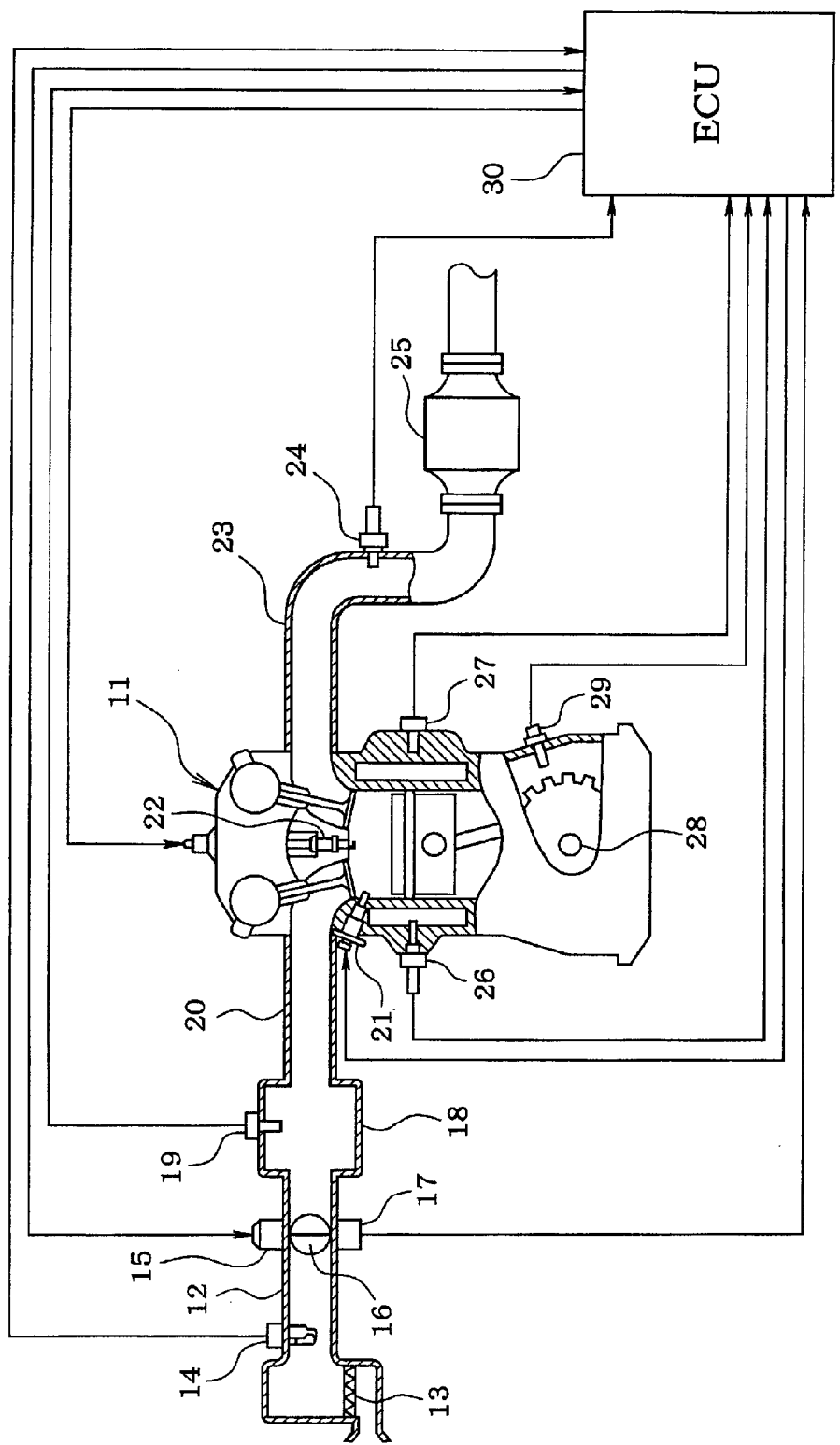
FIG. 1 is a schematic view of an engine control system according to a first embodiment of the present disclosure.

A schematic configuration of an engine control system is described with reference to FIG. 1.

An in-cylinder injection engine 11, which is an in-cylinder injection internal combustion engine, has an air cleaner 13 on a most upstream side of an intake pipe 12, and has an air flow meter 14 detecting an intake air amount on a downstream side of the air cleaner 13. A throttle valve 16, of which the degree of opening is adjusted by a motor 15, and a throttle position sensor 17, which detects the degree of opening of the throttle valve 16 (throttle position), are provided on a downstream side of the air flow meter 14.

A surge tank 18 is further provided on the downstream side of the throttle valve 16, and an intake pipe pressure sensor 19 detecting intake pipe pressure is provided in the surge tank 18. The surge tank 18 has an intake manifold 20 introducing air into each cylinder of the engine 11, and the cylinder has a fuel injection valve 21 that directly injects fuel into the cylinder. An ignition plug 22 is attached to each cylinder head of the engine 11. An air-fuel mixture in each cylinder is ignited by spark discharge of the ignition plug 22 of each cylinder.

An exhaust pipe 23 of the engine 11 has an exhaust gas sensor 24 (an air-fuel ratio sensor, an oxygen sensor) that detects an air-fuel ratio, rich or lean, etc. of exhaust gas. A catalyst 25 such as a ternary catalyst purifying the exhaust gas is provided on a downstream side of the exhaust gas sensor 24.

A cooling water temperature sensor 26 detecting cooling water temperature and a knock sensor 27 detecting knocking are attached to a cylinder block of the engine 11. A crank angle sensor 29, which outputs a pulse signal every time when a crank shaft 28 rotates a predetermined crank angle, is attached on a peripheral side of the crank shaft 28, and a crank angle or engine rotation speed is detected based on an output signal of the crank angle sensor 29.

Output of each of such sensors is received by an electronic control unit (hereinafter mentioned as "ECU") 30. The ECU 30 is mainly configured of a microcomputer, and executes various engine control programs stored in an internal ROM (storage medium), and thereby controls a fuel injection quantity, ignition timing, and a throttle position (an intake air amount) depending on an engine operation state.

Figure 2:
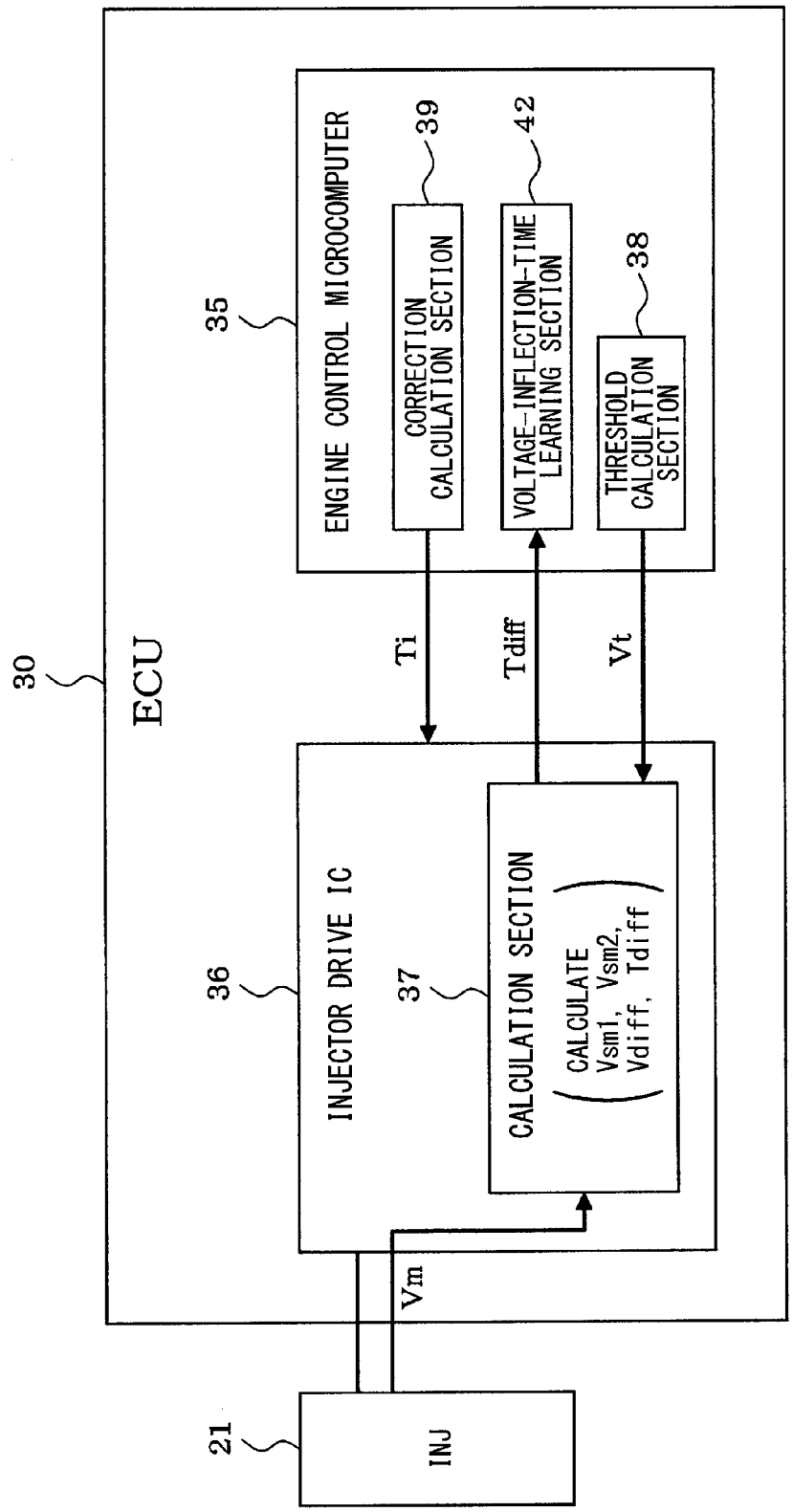
FIG. 2 is a block diagram showing a configuration of ECU according to the first embodiment.

As illustrated in FIG. 2, the ECU 30 has an engine control microcomputer 35 (a microcomputer for control of the engine 11), and an injector drive IC 36 (a drive IC of the fuel injection valve 21), and the like. The ECU 30, specifically the engine control microcomputer 35, calculates a required injection quantity in correspondence to an operation state of the engine (for example, engine rotation speed or an engine load), and calculates a required injection pulse width Ti (injection time) in correspondence to the required injection quantity. In addition, the ECU 30, specifically the injector drive IC 36, drives the fuel injection valve 21 to open with the required injection pulse width Ti corresponding to the required injection quantity so that fuel corresponding to the required injection quantity is injected.

Figure 3:
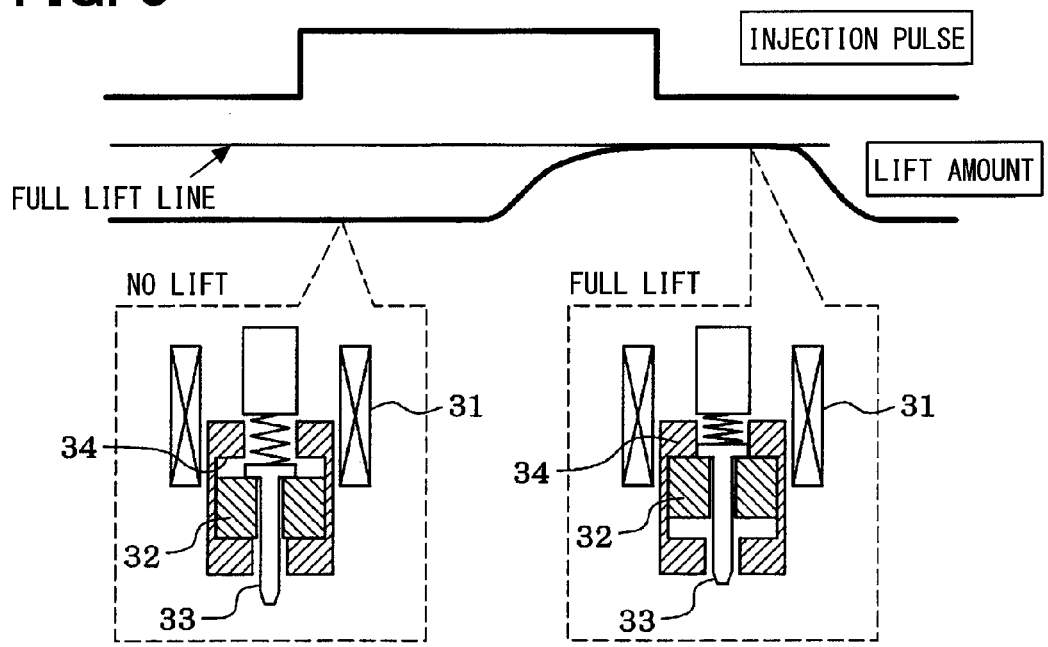
FIG. 3 is a chart for explaining a full lift of a fuel injection valve.
Figure 4:
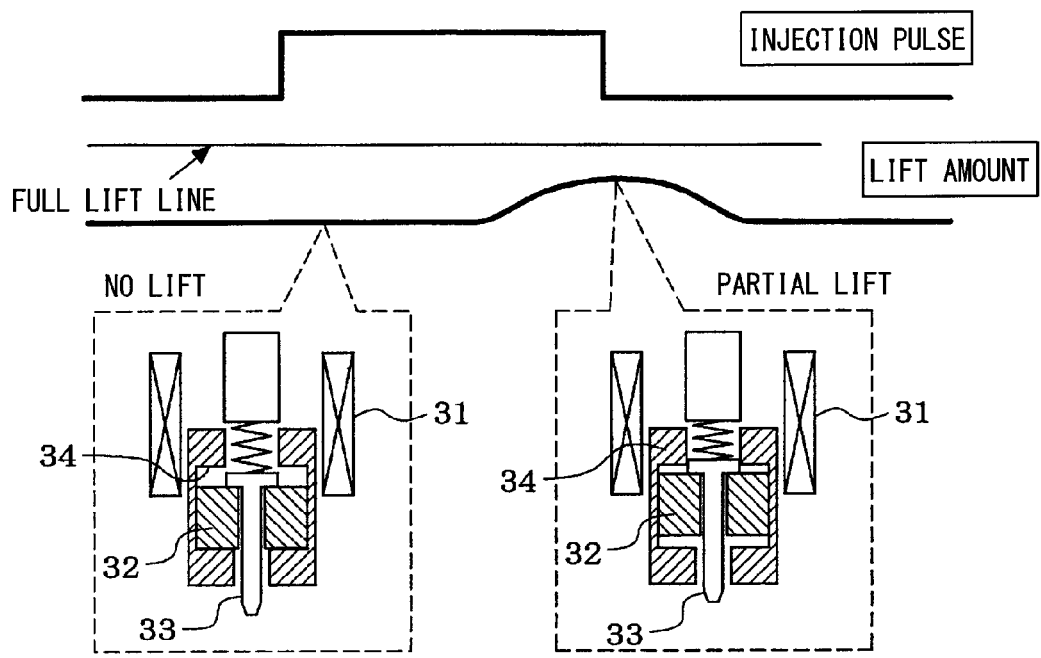
FIG. 4 is a chart for explaining a partial lift of a fuel injection valve.

As illustrated in FIGS. 3 and 4, the fuel injection valve 21 is configured such that when an injection pulse is on so that a current is applied to a drive coil 31, a needle valve 33 (valve element) is moved in a valve-opening direction together with a plunger 32 (movable core) by electromagnetic force generated by the drive coil 31. As illustrated in FIG. 3, the lift amount of the needle valve 33 reaches a full lift position (a position at which the plunger 32 butts against a stopper 34) in a full lift region where an injection pulse width is relatively long. As illustrated in FIG. 4, a partial lift state (a state just before the plunger 32 butts against the stopper 34), in which the lift amount of the needle valve 33 does not reach the full lift position, is given in a partial lift region where the injection pulse width is relatively short.

The ECU 30 serves as an injection control means that performs, in the full lift region, full lift injection to drive the fuel injection valve 21 to open with an injection pulse allowing the lift amount of the needle valve 33 to reach the full lift position, and performs, in the partial lift region, partial lift injection to drive the fuel injection valve 21 to open with an injection pulse providing the partial lift state in which the lift amount of the needle valve 33 does not reach the full lift position.

Figure 5:
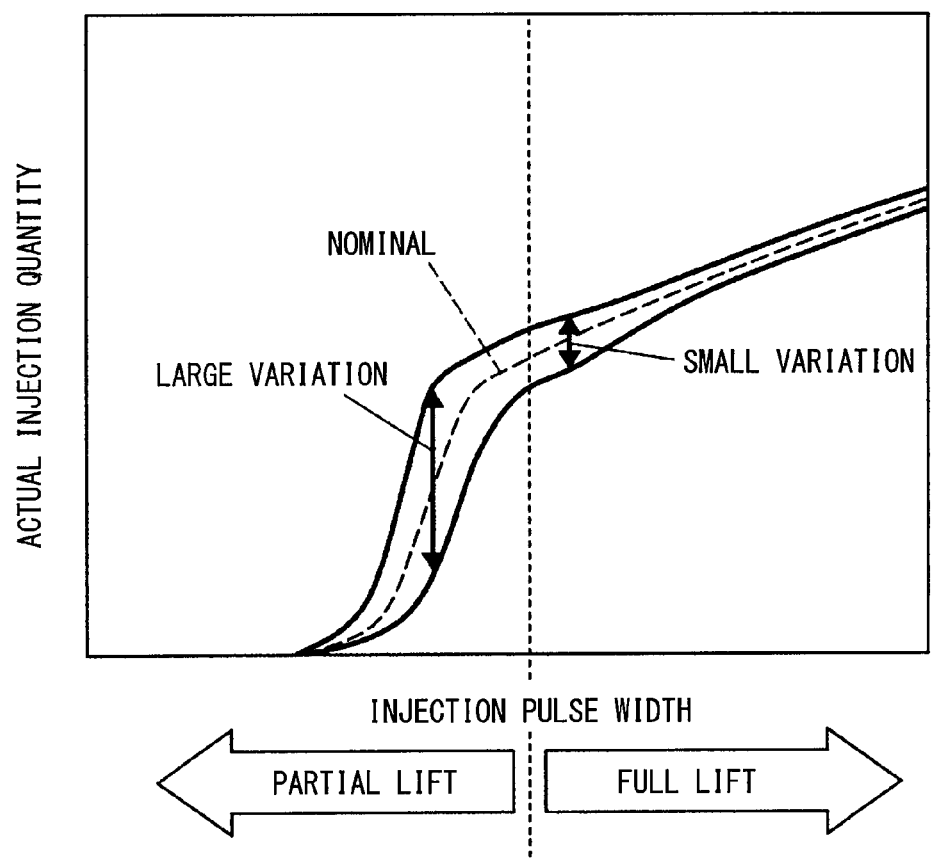
FIG. 5 is a chart illustrating an injection characteristic between an injection pulse width and an actual fuel injection quantity.

For the fuel injection valve 21 of the in-cylinder injection engine 11 that injects high-pressure fuel into the cylinder, as illustrated in FIG. 5, linearity of a variation characteristic of an actual injection quantity with respect to an injection pulse width tends to degrade in the partial lift region (a region of the partial lift state in which the injection pulse width is short so that the lift amount of the needle valve 33 does not reach the full lift position). In the partial lift region, the lift amount of the needle valve 33 tends to greatly vary, leading to a large variation in the injection quantity. Such a large variation in the injection quantity may degrade exhaust emission and drivability.

Figure 16:
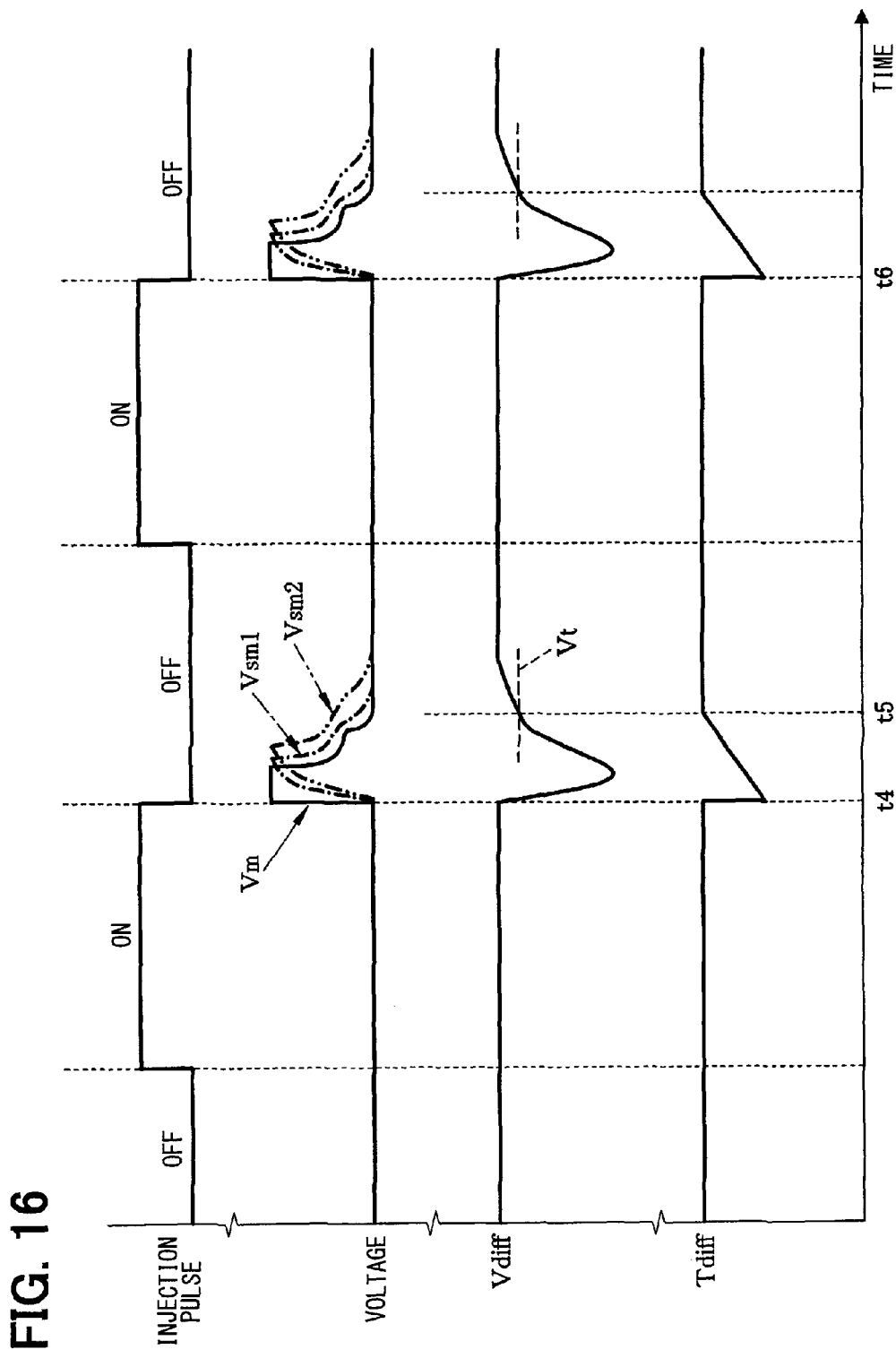
FIG. 16 is a time chart illustrating a voltage inflection time calculation in the third embodiment.

The negative terminal voltage of the fuel injection valve 21 is varied by induced electromotive force after off of the injection pulse (see FIG. 16). At this time, when the fuel injection valve 21 is closed, shift speed of the needle valve 33 (shift speed of the plunger 32) varies relatively greatly, and thus a variation characteristic of the negative terminal voltage is varied. This results in such a voltage inflection point that the variation characteristic of the negative terminal voltage is varied near the valve-closing timing.

Figure 12:
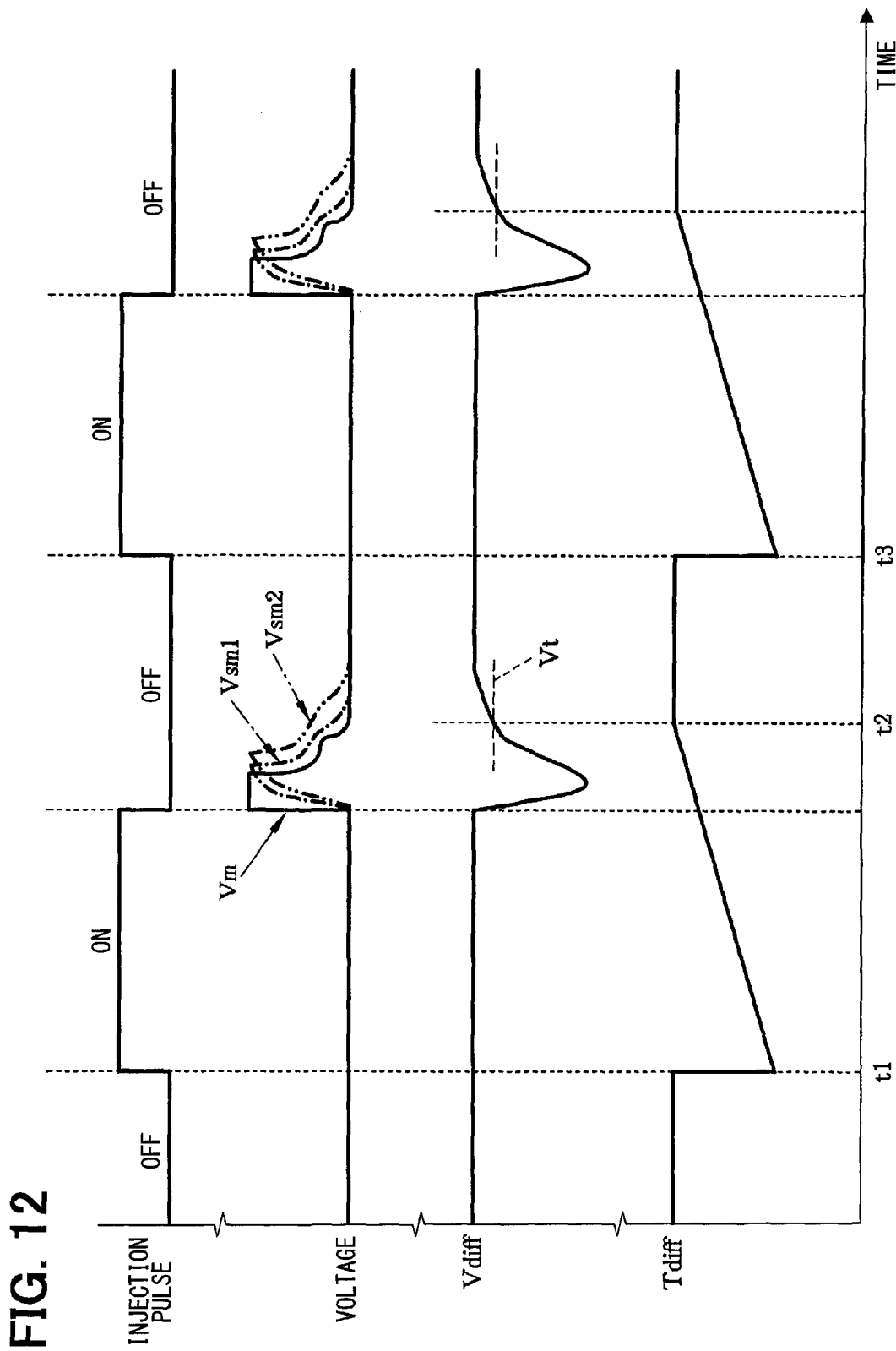
FIG. 12 is a time chart illustrating a voltage inflection time calculation in the first embodiment.

Focusing on such a characteristic, in the first embodiment, the ECU 30 (for example, the injector drive IC 36) executes a voltage inflection time calculation routine of FIG. 12 described later, thereby the voltage inflection time as information on the valve-closing timing is calculated as follows.

During the partial lift injection (at least after off of an injection pulse of the partial lift injection), the ECU 30, specifically a calculation section 37 (see FIG. 2) of the injector drive IC 36, performs a process for each of the cylinders of the engine 11. In the process, the ECU 30 calculates a first filtered voltage Vsm1 being a negative terminal voltage Vm of the fuel injection valve 21 filtered (moderated) by a first low-pass filter having a first frequency f1 as a cutoff frequency, the first frequency f1 being lower than a frequency of a noise component, and calculates a second filtered voltage Vsm2 being the negative terminal voltage Vm of the fuel injection valve 21 filtered (moderated) by a second low-pass filter having a second frequency f2 as a cutoff frequency, the second frequency f2 being lower than the first frequency. Consequently, it is possible to calculate the first filtered voltage Vsm1 being the negative terminal voltage Vm from which a noise component is removed, and the second filtered voltage Vsm2 for voltage inflection detection.

Furthermore, the ECU 30, specifically the calculation section 37 of the injector drive IC 36, performs a process for each of the cylinders of the engine 11. In the process, the ECU 30 calculates a difference Vdiff (=Vsm1−Vsm2) between the first filtered voltage Vsm1 and the second filtered voltage Vsm2, and calculates time from a predetermined reference timing to a timing when the difference Vdiff has a inflection point as voltage inflection time Tdiff. At this time, in the first embodiment, the ECU 30 calculates the voltage inflection time Tdiff with a timing when the difference Vdiff exceeds a predetermined threshold Vt as the timing when the difference Vdiff has an inflection point. In other words, time from the predetermined reference timing to the timing when the difference Vdiff exceeds the predetermined threshold Vt is calculated as the voltage inflection time Tdiff. Consequently, it is possible to accurately calculate the voltage inflection time Tdiff that varies depending on the valve-closing timing of the fuel injection valve 21. In the first embodiment, the voltage inflection time Tdiff is calculated with the reference timing being a timing when an injection pulse of the partial lift injection is switched from off to on. The threshold Vt is calculated by a threshold calculation section 38 (see FIG. 2) of the engine control microcomputer 35 depending on fuel pressure, fuel temperature, or the like. The threshold Vt may be a beforehand set, fixed value.

Figure 6:
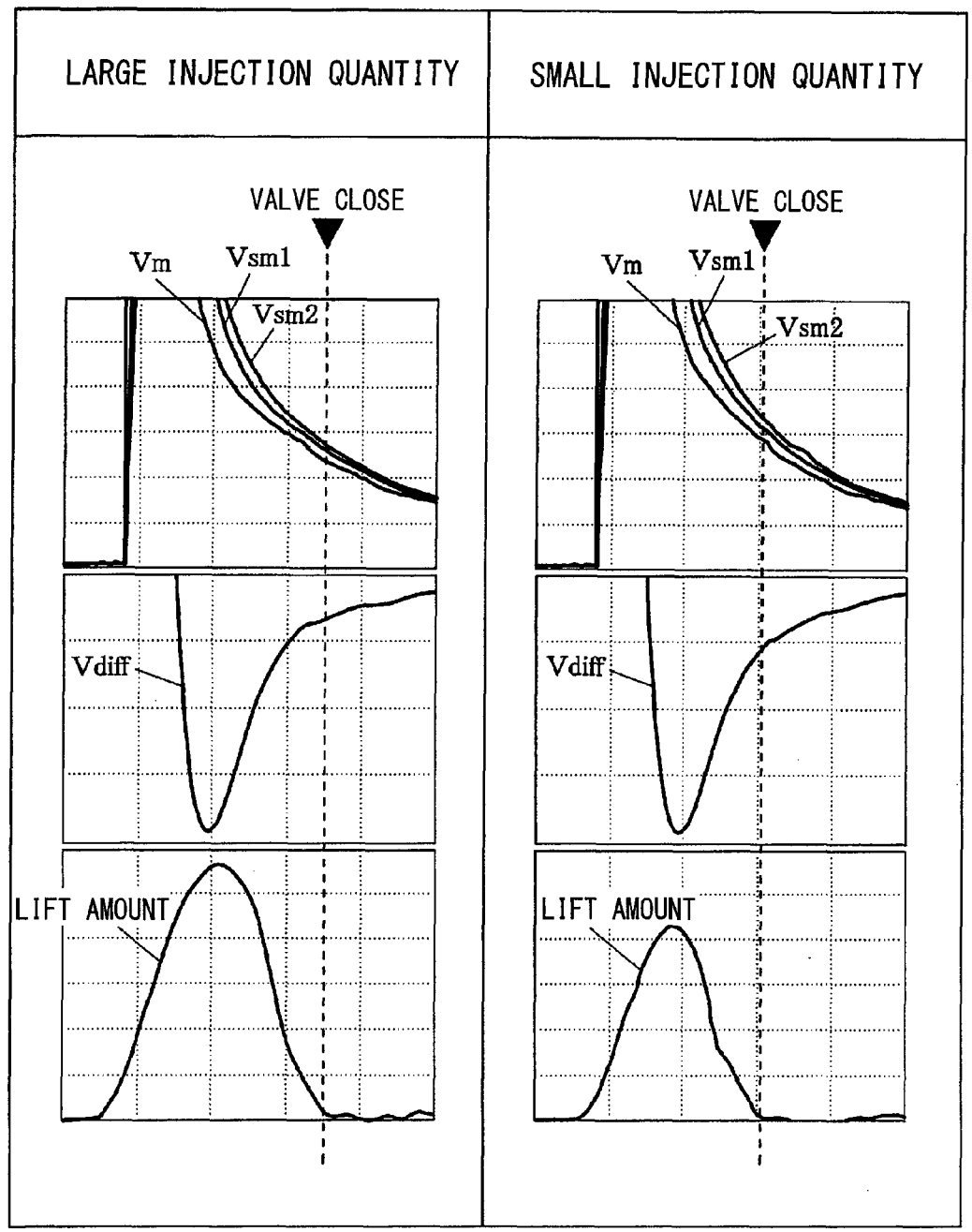
FIG. 6 is a chart for explaining a relationship between a fuel injection quantity and a valve-closing timing of the fuel injection valve.
Figure 7:
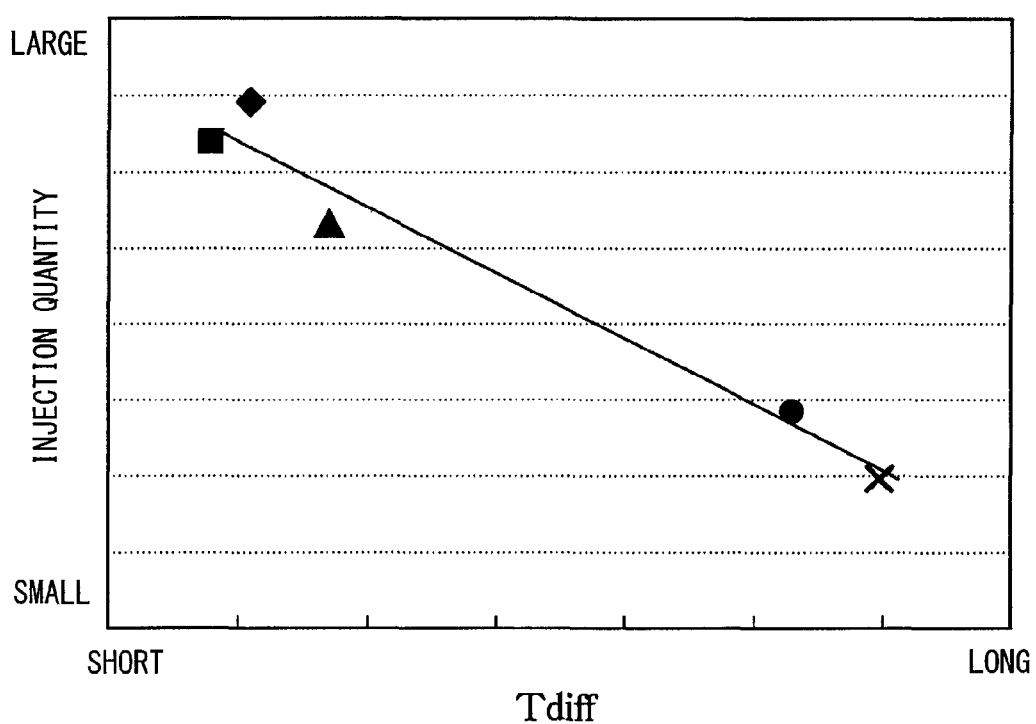
FIG. 7 is a diagram illustrating a relationship between the voltage inflection time and the injection quantity of the fuel injection valve.

In the partial lift region of the fuel injection valve 21, as illustrated in FIG. 6, since a variation in lift amount of the fuel injection valve 21 causes variations in the injection quantity and in the valve-closing timing, a correlation exists between the injection quantity and the valve-closing timing of the fuel injection valve 21. Furthermore, since the voltage inflection time Tdiff varies depending on the valve-closing timing of the fuel injection valve 21, a correlation exists between the voltage inflection time Tdiff and the injection quantity as illustrated in FIG. 7.

In view of the above relationship, the voltage-inflection-time learning section 42 (refer to FIG. 2) of the microcomputer 35 calculates an averaged value Tdiff.ave of the voltage inflection times Tdiff as the learning value of the voltage inflection time. The injection pulse correction calculation section 39 (refer to FIG. 2) of the microcomputer 35 corrects the injection pulse of the partial lift injection based on the learning value Tdiff.ave. Thereby, the injection pulse of the partial lift injection can be accurately corrected.

In the first embodiment, the ECU 30 executes a voltage-inflection-time learning routine to obtain the learning value Tdiff.ave of the voltage inflection time.

Figure 8:
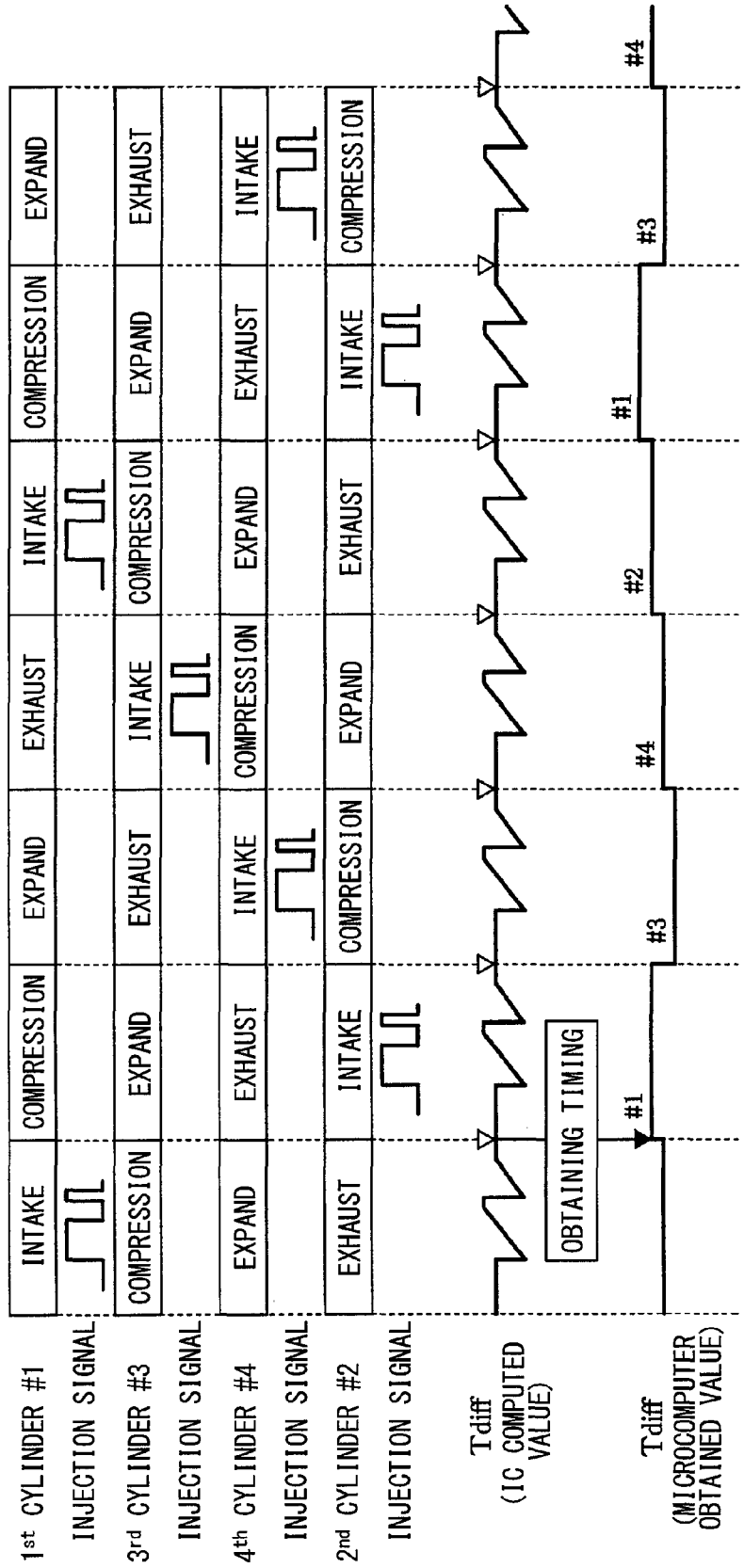
FIG. 8 is a time chart for explaining a voltage inflection time obtaining method.

As shown in FIG. 8, the engine control microcomputer 35 (voltage-inflection-time learning section 42) obtains the voltage inflection times Tdiff from the injector drive IC 36 (calculation section 37) when it is the obtaining timing of the voltage inflection times Tdiff with respect to each cylinder (for example, the first cylinder #1 to the fourth cylinder #4). That is, the voltage inflection time Tdiff [#i] of the i-th cylinder #i (for example, i=1-4) is obtained at the obtaining timing of the voltage inflection time Tdiff [#i].

Figure 9:
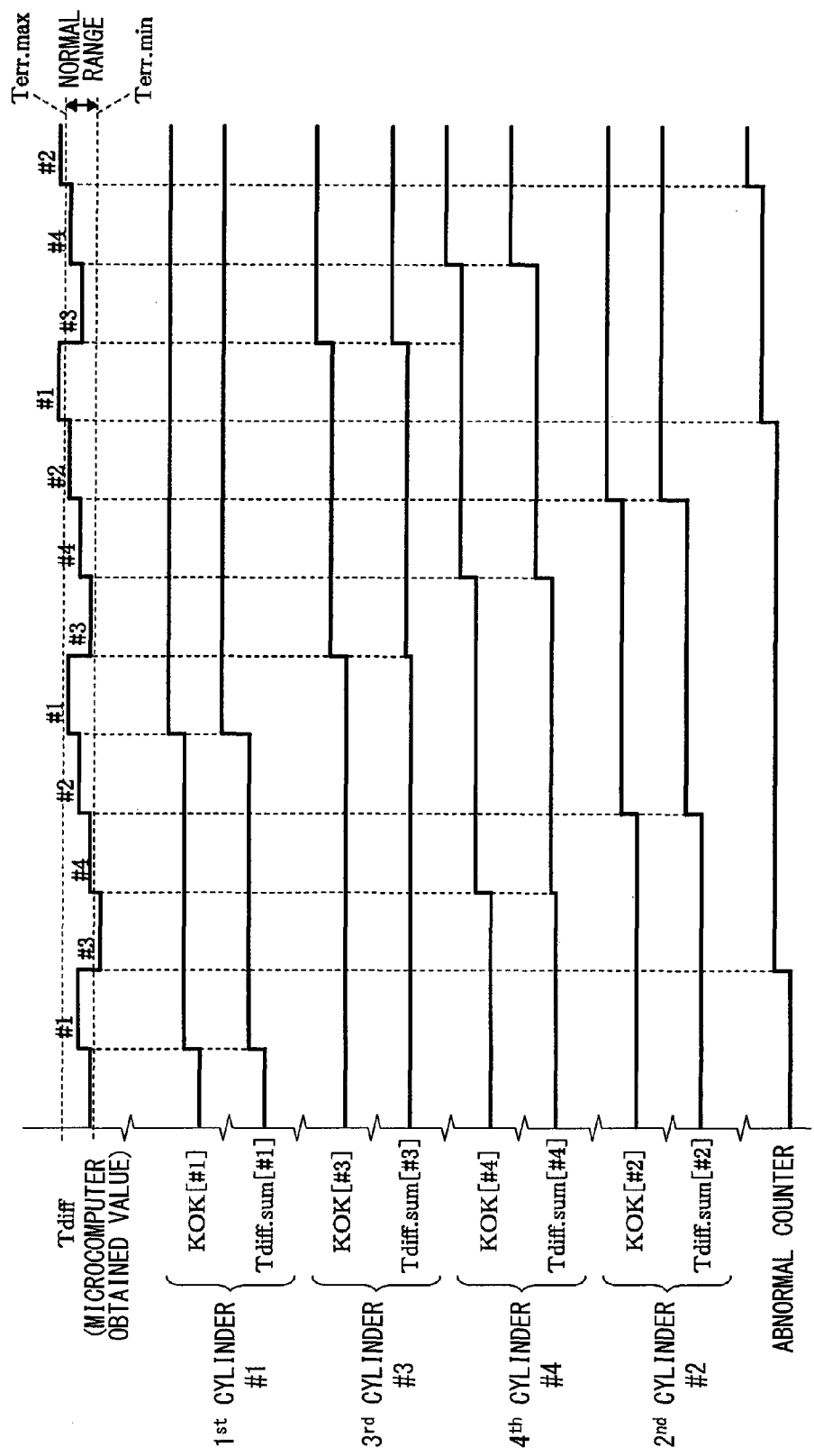
FIG. 9 is a time chart illustrating a normal counter, an integrated value of the voltage inflection time, and an abnormal counter.

As shown in FIG. 9, the engine control microcomputer 35 (voltage-inflection-time learning section 42) has a normal counter with respect to each cylinder (for example, the first cylinder #1 to the fourth cylinder #4), and an abnormal counter which is common to all cylinders.

When the voltage inflection time Tdiff [#i] of the i-th cylinder #i is within a normal range (Terr.min≤Tdiff[#i] ≤Terr.max), the normal counter of the i-th cylinder #i counts up the count value KOK[#i]. Furthermore, the currently obtained voltage inflection time Tdiff [#i] of the i-th cylinder #i is integrated to update the integrated value Tdiff.sum [#i] of the voltage inflection time of the i-th cylinder #i. Specifically, the currently obtained integrated value Tdiff.sum [#i] is added to the previous integrated value Tdiff.sum[#i] old, whereby the integrated value Tdiff.sum [#i] of the voltage inflection time of the i-th cylinder #i is obtained.

$$T\text{diff.sum}[\#i]=T\text{diff.sum}[\#i]\text{old}+T\text{diff}[\#i]$$

Meanwhile, when the voltage inflection time Tdiff [#i] of the i-th cylinder #i is out of the normal range (Tdiff[#i] <Terr.min or Terr.max<Tdiff[#i]), the abnormal counter of all cylinder counts up the count value KNG. In this case, the currently obtained voltage inflection time Tdiff[#i] of the i-th cylinder #i is not integrated. That is, the voltage inflection time Tdiff [#i] of the i-th cylinder #i is not used for equalizing processing.

Then, when the counting value KOK[#i] of the normal counter of the i-th cylinder #i reaches a specified value KOKthr, it is determined that data of the counting values KOK[#i] are integrated, which corresponds to the specified value KOKthr. The integrated value Tdiff.sum [#i] of the voltage inflection time is divided by the specified value KOKthr to obtain the averaged value Tdiff.ave [#i] as the learning value of the voltage inflection time of the i-th cylinder #i.

$$T\text{diff.ave}[\#i]=T\text{diff.sum}[\#i]/KOKthr$$

Meanwhile, when the counting value KNG of the abnormal counter exceeds a specified value KNGthr, it is determined that the injector drive IC 36 has malfunctions. The correction of the injection pulse based on the learning value Tdiff.ave is prohibited.

In the first embodiment, the injector drive IC 36 (the calculation section 37) collectively serves as the filtered-voltage acquisition means, the difference calculation means, and the time calculation means, and the engine control microcomputer 35 (an injection pulse correction calculation section 39) serves as the injection pulse correction means.

Figure 10:
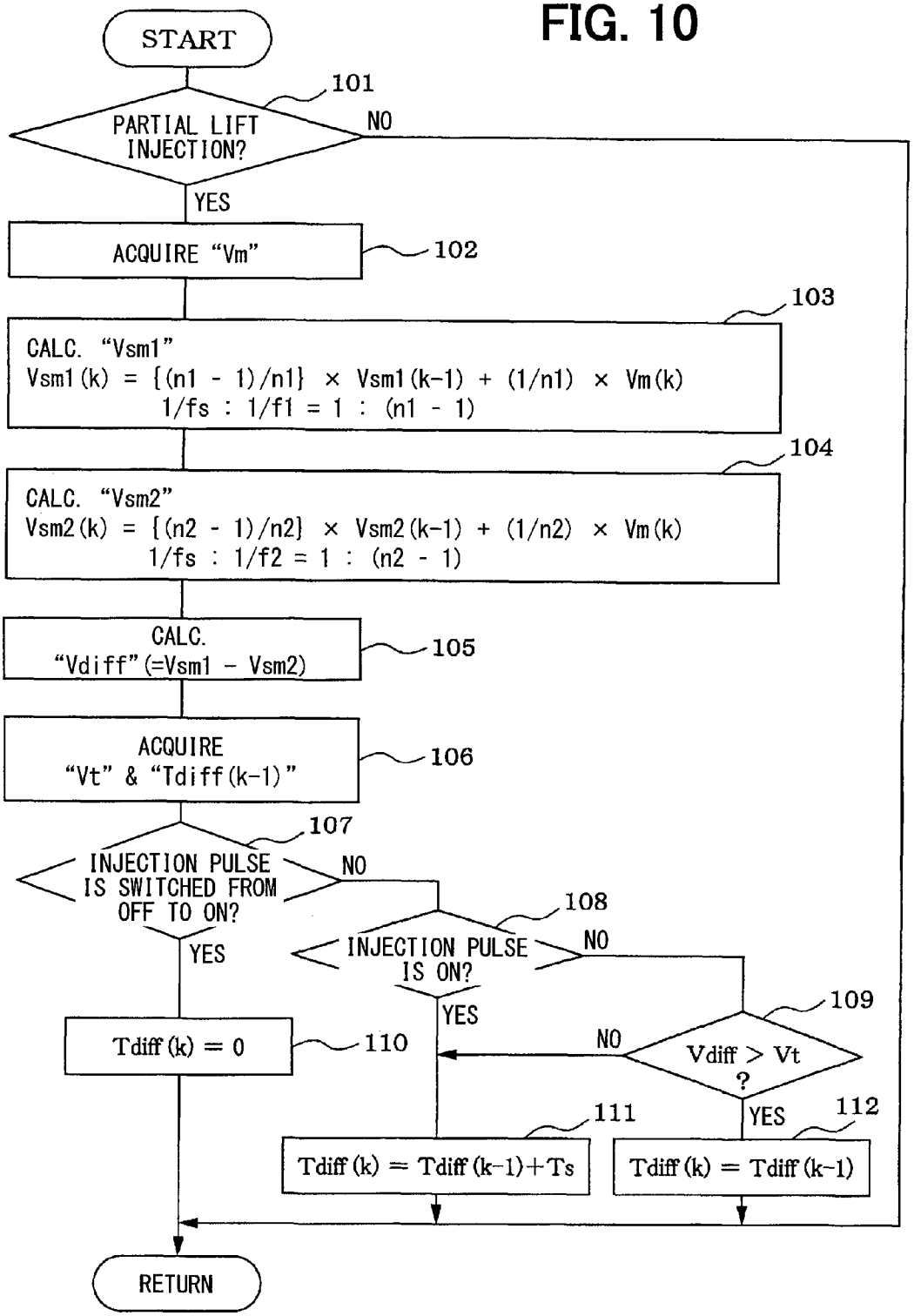
FIG. 10 is a flow chart illustrating a processing of a voltage inflection time calculation routine according to the first embodiment.
Figure 11:
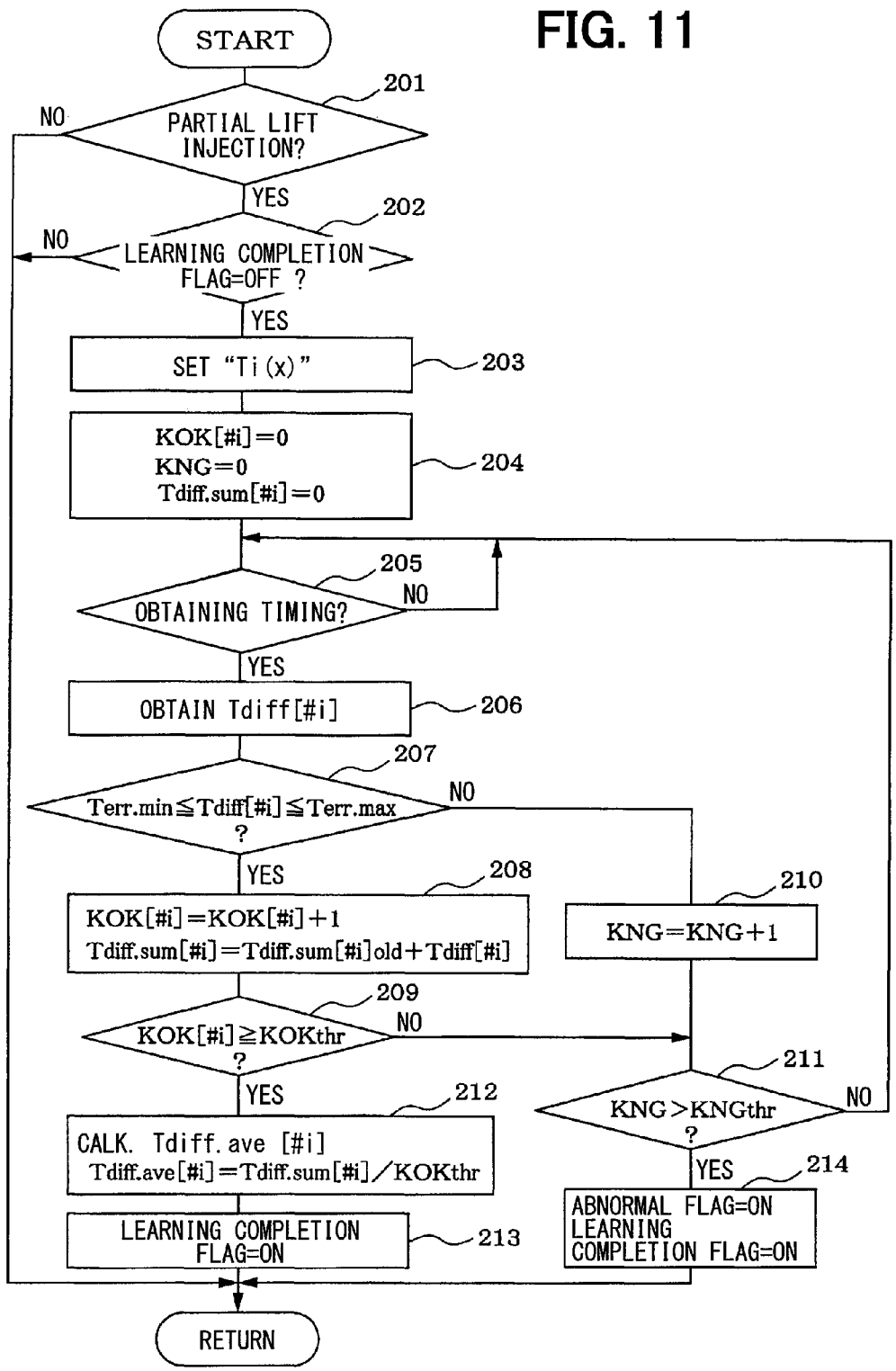
FIG. 11 is a flow chart illustrating a processing of a voltage inflection time learning routine.

Processing details of routines, i.e., the voltage inflection time calculation routine of FIG. 10 and the injection pulse correction routine of FIG. 11, executed by the ECU 30 (the engine control microcomputer 35 and/or the injector drive IC 36) in the first embodiment are now described.

[Voltage Inflection Time Calculation Routine]

The voltage inflection time calculation routine illustrated in FIG. 10 is repeatedly executed with a predetermined calculation period Ts during power-on of the ECU 30 (for example, during on of an ignition switch). When this routine is started, whether or not the partial lift injection is being performed is determined in step 101. If the partial lift injection is determined to be not being performed in step 101, the routine is finished while step 102 and subsequent steps are not performed.

If the partial lift injection is determined to be being performed in step 101, then in step 102 the negative terminal voltage Vm of the fuel injection valve 21 is acquired. In this case, the calculation period Ts of the routine corresponds to a sampling period Ts of the negative terminal voltage Vm.

Subsequently, in step 103, there is calculated a first filtered voltage Vsm1 being the negative terminal voltage Vm of the fuel injection valve 21 filtered by a first low-pass filter having a first frequency f1 as a cutoff frequency, the first frequency f1 being lower than a frequency of a noise component, (i.e., a low-pass filter having a passband being a frequency band lower than the cutoff frequency f1).

The first low-pass filter is a digital filter implemented by Formula (1) to obtain a current value Vsm1($k$) of the first filtered voltage using a previous value Vsm1($k$−1) of the first filtered voltage and a current value Vm(k) of the negative terminal voltage.

$$Vsm1(k)=\{(n1-1)/n1\}\times Vsm1(k-1)+(1/n1)\times Vm(k) \quad (1)$$

The time constant n1 of the first low-pass filter is set such that the relationship of Formula (2) is satisfied, where fs (=1/Ts) is a sampling frequency of the negative terminal voltage Vm, and f1 is the cutoff frequency of the first low-pass filter.

$$1/fs:1/f1=1:(n1-1) \quad (2)$$

Consequently, it is possible to easily calculate the first filtered voltage Vsm1 filtered by the first low-pass filter having the first frequency f1 as the cutoff frequency, the first frequency f1 being lower than the frequency of the noise component.

Subsequently, in step 104, there is calculated a second filtered voltage Vsm2 being the negative terminal voltage Vm of the fuel injection valve 21 filtered by a second low-pass filter having a second frequency f2 as a cutoff frequency, the second frequency f2 being lower than the first frequency f1 (i.e., a low-pass filter having a passband being a frequency band lower than the cutoff frequency f2).

The second low-pass filter is a digital filter implemented by Formula (3) to obtain a current value Vsm2($k$) of the second filtered voltage using a previous value Vsm2($k$−1) of the second filtered voltage and a current value Vm(k) of the negative terminal voltage.

$$Vsm2(k)=\{(n2-1)/n2\}\times Vsm2(k-1)+(1/n2)\times Vm(k) \quad (3)$$

The time constant n2 of the second low-pass filter is set such that the relationship of Formula (4) is satisfied, where fs (=1/Ts) is the sampling frequency of the negative terminal voltage Vm, and f2 is the cutoff frequency of the second low-pass filter.

$$1/fs:1/f2=1:(n2-1) \quad (4)$$

Consequently, it is possible to easily calculate the second filtered voltage Vsm2 filtered by the second low-pass filter having the second frequency f2 as the cutoff frequency, the second frequency f2 being lower than the first frequency f1.

Subsequently, in step 105, the difference Vdiff (=Vsm1− Vsm2) between the first filtered voltage Vsm1 and the second filtered voltage Vsm2 is calculated. The difference Vdiff may be subjected to guard processing so as to be less than 0 to extract only a negative component.

Subsequently, in step 106, the threshold Vt is acquired, and a previous value Tdiff(k−1) of the voltage inflection time is acquired.

Subsequently, in step 107, whether or not the injection pulse is switched from off to on at the current timing is determined. If the injection pulse is determined to be switched from off to on at the current timing in step 107, then in step 110 a current value Tdiff(k) of the voltage inflection time is reset to "0".

$$Tdiff(k)=0$$

If the injection pulse is determined to be not switched from off to on at the current timing in step 107, then in step 108 whether or not the injection pulse is on is determined. If the injection pulse is determined to be on in step 108, then in step 111 a predetermined value Ts (the calculation period of this routine) is added to the previous value Tdiff(k−1) of the voltage inflection time to obtain the current value Tdiff(k) of the voltage inflection time, so that the voltage inflection time Tdiff is counted up.

$$Tdiff(k)=Tdiff(k-1)+Ts$$

If the injection pulse is determined to be not on (i.e., the injection pulse is off) in step 108, then in step 109 whether or not the difference Vdiff between the first filtered voltage Vsm1 and the second filtered voltage Vsm2 exceeds the threshold Vt (whether or not the difference Vdiff inversely becomes larger than the threshold Vt) is determined.

If the difference Vdiff between the first filtered voltage Vsm1 and the second filtered voltage Vsm2 is determined not to exceed the threshold Vt in step 109, the voltage inflection time Tdiff is continuously counted up in step 111.

If the difference Vdiff between the first filtered voltage Vsm1 and the second filtered voltage Vsm2 is determined to exceed the threshold Vt in step 109, then in step 112 calculation of the voltage inflection time Tdiff is determined to be completed, and the current value Tdiff(k) of the voltage inflection time is maintained to the previous value Tdiff(k−1).

$$Tdiff(k)=Tdiff(k-1)$$

Consequently, time from a timing (reference timing), at which the injection pulse is switched from off to on, to a timing, at which the difference Vdiff exceeds the threshold Vt, is calculated as the voltage inflection time Tdiff, and the calculated value of the voltage inflection time Tdiff is maintained until the next reference timing. The process of calculating the voltage inflection time Tdiff is thus performed for each of the cylinders of the engine 11.

[Voltage Inflection Time Learning Routine]

A voltage inflection time learning routine illustrated in FIG. 11 is repeatedly executed with a predetermined calculation period during power-on of the ECU 30 (for example, during on of the ignition switch). When this routine is started, whether or not the partial lift injection is being performed is determined in step 201. If the partial lift injection is determined to be not being performed in step 201, the routine is finished while step 202 and subsequent steps are not executed.

Meanwhile, when the answer is Yes in 201, the procedure proceeds to step 202 in which the ECU 30 determines whether the leaning completion flag is OFF. When the answer is No in step 202, the routine is finished without performing the subsequent steps.

If the partial lift injection is determined to be being performed in step 201, then in step 203 whether or not a predetermined performance condition is established is determined based on, for example, whether or not the injection pulse width Ti may be set to a typical injection pulse width Ti(x) described later in the current operation state.

For the fuel injection valve 21, a variation range of the injection quantity tends to be maximal in a region near an injection pulse width giving an injection quantity roughly half the injection quantity Qa corresponding to the boundary of the partial lift injection and the full lift injection. In consideration of such a characteristic, the typical injection pulse width Ti(x) is set to an injection pulse width giving an injection quantity that is half the injection quantity Qa corresponding to the boundary of the partial lift injection and the full lift injection.

Then, the procedure proceeds to step 204 in which the ECU 30 resets the counting value KOK[#i] of the normal counter to "0", and resets the counting value KNG of the abnormal counter to "0". Furthermore, the ECU 30 resets the integrated value Tdiff.sum [#i] to "0".

Then, the procedure proceeds to step 205 in which the ECU 30 determines whether it is the obtaining timing of the voltage inflection time Tdiff[#i] of the i-th cylinder #i.

When the answer is Yes in step 205, the procedure proceeds to step 206 in which the ECU 30 obtains the voltage inflection time Tdiff[#i] of the i-th cylinder #i from the injector drive IC 36 (calculation section 37).

Then, it progresses to Step 207 and ECU 30 determines whether the voltage inflection time Tdiff [#i] of the i-th cylinder #i is within a normal range (Terr.min≤Tdiff[#i] ≤Terr.max). The normal range is established based on an upper limit and a lower limit of the voltage inflection time Tdiff, which are computed when the quality (characteristics, size, etc.) of the injector drive IC 36 and the fuel injection valve 21 is within a permissible range. That is, the upper limit Terr.max of the normal range corresponds to the upper limit of the voltage inflection time Tdiff. The lower limit Terr.min of the normal range is corresponds to the lower limit of the voltage inflection time Tdiff.

When the answer is Yes in step 207, the procedure proceeds to step 208 in which the counting value KOK[#i] of the normal counter is counted up.

$$KOK[\#i]=KOK[\#i]+1$$

Furthermore, the ECU 30 integrates the voltage inflection time Tdiff[#i] of the i-th cylinder #i to update the integrated value Tdiff.sum [#1] of the voltage inflection time of the i-th cylinder #1. Specifically, the currently obtained integrated value Tdiff.sum [#i] is added to the previous integrated value Tdiff.sum[#i] old, whereby the integrated value Tdiff.sum [#i] of the voltage inflection time of the i-th cylinder #i is obtained.

$$Tdiff.sum[\#i]=Tdiff.sum[\#i]old+Tdiff[\#i]$$

Then, the procedure proceeds to step 209 in which the ECU 30 determines whether the counting value KOK[#i] of the normal counter of the i-th cylinder #i reaches a specified value KOKthr (KOK[#i]≥KOKthr). When the answer is No in step 209, the procedure proceeds to step 211.

When the answer is No in step 207, the procedure proceeds to step 210 in which the counting value KNG of the abnormal counter is counted up.

$$KNG=KNG+1$$

In this case, the currently obtained voltage inflection time Tdiff[#i] of the i-th cylinder #i is not integrated. That is, the voltage inflection time Tdiff [#1] of the i-th cylinder #i is not used for equalizing processing.

Then, the procedure proceeds to step 211 in which the ECU 30 determines whether the counting value KNG exceeds the specified value KNGthr (KNG>KNGthr). The specified value KNGthr is larger than the specified value KOKthr.

When the answer is No in step 211, the procedure goes back to step 205.

Then, when the counting value KOK[#i] of the normal counter of the i-th cylinder #i reaches a specified value KOKthr (KOK[#i]≥KOKthr), the ECU 30 determines that data of the voltage inflection time Tdiff [#i] are integrated, which corresponds to the specified value KOKthr. Then, the procedure proceeds to step 212 in which the integrated value Tdiff.sum [#i] of the voltage inflection time is divided by the specified value KOKthr to obtain the averaged value Tdiff.ave [#i] as the learning value of the voltage inflection time of the i-th cylinder #i.

$$Tdiff.ave[\#i]=Tdiff.sum[\#i]/KOKthr$$

Then, the procedure proceeds to step 213 in which the ECU 30 set the leaning completion flag to "ON". Then, the procedure is terminated.

Meanwhile, when the answer is Yes in step 211, the procedure proceeds to step 214 in which the ECU 30 prohibits the correction of the injection pulse based on the learning value Tdiff.ave and turns the leaning completion flag to "ON" to end the routine.

Referring to a time chart shown in FIG. 12, an example of the voltage inflection time calculation will be explained, hereinafter.

During the partial lift injection (at least after off of the injection pulse of the partial lift injection), the first filtered voltage Vsm1 being the negative terminal voltage Vm of the fuel injection valve 21 filtered by the first low-pass filter is calculated, and the second filtered voltage Vsm2 being the negative terminal voltage Vm of the fuel injection valve 21 filtered by the second low-pass filter is calculated. Furthermore, the difference Vdiff (=Vsm1−Vsm2) between the first filtered voltage Vsm1 and the second filtered voltage Vsm2 is calculated.

The voltage inflection time Tdiff is reset to "0" at a timing (reference timing) t1 when the injection pulse is switched from off to on, and then calculation of the voltage inflection time Tdiff is started, and the voltage inflection time Tdiff is repeatedly counted up with the predetermined calculation period Ts.

Subsequently, the calculation of the voltage inflection time Tdiff is completed at a timing t2 when the difference Vdiff between the first filtered voltage Vsm1 and the second filtered voltage Vsm2 exceeds the threshold Vt after off of the injection pulse. Consequently, time from the timing (reference timing) t1, at which the injection pulse is switched from off to on, to the timing t2, at which the difference Vdiff exceeds the threshold Vt, is calculated as the voltage inflection time Tdiff.

The calculated value of the voltage inflection time Tdiff is maintained until the next reference timing t3, during which (during a period from the calculation completion timing t2 of the voltage inflection time Tdiff to the next reference timing t3) the engine control microcomputer 35 acquires the voltage inflection time Tdiff from the injector drive IC 36.

In the first embodiment, during the partial lift injection (at least after off of the injection pulse of the partial lift injection), the first filtered voltage Vsm1 being the negative terminal voltage Vm of the fuel injection valve 21 filtered by the first low-pass filter is calculated, making it possible to calculate the first filtered voltage Vsm1 containing no noise component. In addition, the second filtered voltage Vsm2 being the negative terminal voltage Vm of the fuel injection valve 21 filtered with the second low-pass filter is calculated, making it possible to calculate the second filtered voltage Vsm2 for voltage inflection detection.

Furthermore, the difference Vdiff between the first filtered voltage Vsm1 and the second filtered voltage Vsm2 is calculated, and the time from the timing (reference timing), at which the injection pulse is switched from off to on, to the timing, at which the difference Vdiff exceeds the threshold Vt, is calculated as the voltage inflection time Tdiff, making it possible to accurately calculate the voltage inflection time Tdiff that varies depending on the valve-closing timing of the fuel injection valve 21.

The injection pulse of the partial lift injection is corrected based on the voltage inflection time Tdiff, thereby the injection pulse of the partial lift injection can be accurately corrected.

In the first embodiment, the averaged value Tdiff.ave is obtains as the learning value of the voltage inflection time, and the injection pulse of the partial lift injection is corrected based on the learning value Tdiff.ave. Thus, the noises contained in the voltage inflection time Tdiff can be reduced, and the correction accuracy of an injection pulse based on the voltage inflection time Tdiff can be improved.

Moreover, in the first embodiment, when the voltage inflection time Tdiff is within the normal range, the normal counter is counted up. When the voltage inflection time Tdiff is out of the normal range, the abnormal counter is counted up. The voltage inflection time Tdiff is not used for equalizing processing. The leaning value Tdiff.ave can be obtained without receiving influence of the abnormal value.

Furthermore, in the first embodiment, when the counting value KOK reaches the specified value KOKthr, the equalizing processing is performed. By performing the equalizing processing, the learning value Tdiff.ave of the voltage inflection time can be calculated.

Moreover, in the first embodiment, the normal counter is provided to each cylinder. When the counting value KOK of the normal counter reaches the specified value KOKthr, the equalizing processing is performed to obtain the learning value Tdiff.ave. Meanwhile, since the common abnormal counter is provided to all cylinder, the malfunctions of the injector drive IC 36 can be detected promptly even if the malfunction of the injector drive IC 36 is generated at random.

Furthermore, when the counting value KNG of the abnormal counter exceeds a specified value KNGthr, it is determined that the injector drive IC 36 has malfunctions. The correction of the injection pulse based on the learning value Tdiff.ave is prohibited. Thus, the malfunction of the injector drive IC 36 can be detected based on the counting value KNG of the abnormal counter. When the malfunction of the injector drive IC 36 is detected, the correction of the injection pulse based on the learning value Tdiff.ave is prohibited. Thus, the incorrect correction of an injection pulse can be avoided.

Also, in the first embodiment, the specified value KNGthr is larger than the specified value KOKthr. Thus, it is avoided that the counting value KNG exceeds the specified value KNGthr even if the counting value KNG of an abnormal counter counts up incorrectly due to noises.

Moreover, in the first embodiment, the normal range is established based on an upper limit and a lower limit of the voltage inflection time Tdiff, which are computed when the quality (characteristics, size, etc.) of the injector drive IC 36 and the fuel injection valve 21 is within a permissible range. Thus, the normal range can be established in such a manner that the voltage inflection time Tdiff is out of the normal range when the quality of the injector drive IC or the fuel injection valve 21 is out of the permissible range.

In the first embodiment, since a digital filter is used as each of the first and second low-pass filters, the first and second low-pass filters can be easily implemented.

Furthermore, in the first embodiment, the injector drive IC 36 (the calculation section 37) collectively serves as the filtered-voltage acquisition means, the difference calculation means, and the time calculation means. Hence, the functions of the filtered-voltage acquisition means, the difference calculation means, and the time calculation means can be achieved only by modifying the specification of the injector drive IC 36 in the ECU 30, and the calculation load of the engine control microcomputer 35 can be reduced.

In the first embodiment, the voltage inflection time Tdiff is calculated with the reference timing being a timing when the injection pulse is switched from off to on; hence, the voltage inflection time Tdiff can be accurately calculated with reference to the timing when the injection pulse is switched from off to on.

In the first embodiment, the voltage inflection time Tdiff is reset at the reference timing, and then calculation of the voltage inflection time Tdiff is started, and calculation of the voltage inflection time Tdiff is completed at the timing when the difference Vdiff between the first filtered voltage Vsm1 and the second filtered voltage Vsm2 exceeds the threshold Vt. Hence, the calculated value of the voltage inflection time Tdiff can be maintained from completion of calculation of the voltage inflection time Tdiff to the next reference timing, which lengthens a period during which the engine control microcomputer 35 can acquire the voltage inflection time Tdiff.

Second Embodiment

A second embodiment of the disclosure is now described with reference to FIGS. 13 and 14. However, portions substantially the same as those in the first embodiment are not or briefly described, and differences from the first embodiment are mainly described.

In the first embodiment, the voltage inflection time Tdiff is calculated with the timing, at which the difference Vdiff between the first filtered voltage Vsm1 and the second filtered voltage Vsm2 exceeds the threshold Vt, as the timing when the difference Vdiff has an inflection point. In the second embodiment, the ECU 30 executes a voltage inflection time calculation routine of FIG. 13 described later so that the voltage inflection time Tdiff is calculated as follows.

The ECU 30, specifically the calculation section 37 of the injector drive IC 36, calculates a third filtered voltage Vdiff.sm3 being the difference Vdiff filtered (moderated) by a third low-pass filter having a third frequency f3 as the cutoff frequency, the third frequency f3 being lower than a frequency of a noise component, and calculates a fourth filtered voltage Vdiff.sm4 being the difference Vdiff filtered (moderated) by a fourth low-pass filter having a fourth frequency f4 as the cutoff frequency, the fourth frequency f4 being lower than the third frequency f3. Furthermore, a difference between the third filtered voltage Vdiff.sm3 and the fourth filtered voltage Vdiff.sm4 is calculated as a second order differential Vdiff2 (=Vdiff.sm3−Vdiff.sm4), and the voltage inflection time Tdiff is calculated with a timing when the second order differential Vdiff2 has an extreme value (for example, a timing when the second order differential Vdiff2 no longer increases) as the timing when the difference Vdiff has an inflection point. Specifically, time from a predetermined reference timing to the timing when the second order differential Vdiff2 has an extreme value is calculated as the voltage inflection time Tdiff. This makes it possible to accurately calculate the voltage inflection time Tdiff, which varies depending on valve-closing timing of the fuel injection valve 21, at an early timing. In the second embodiment, the voltage inflection time Tdiff is calculated with a reference timing being a timing when the injection pulse of the partial lift injection is switched from off to on.

Figure 13:
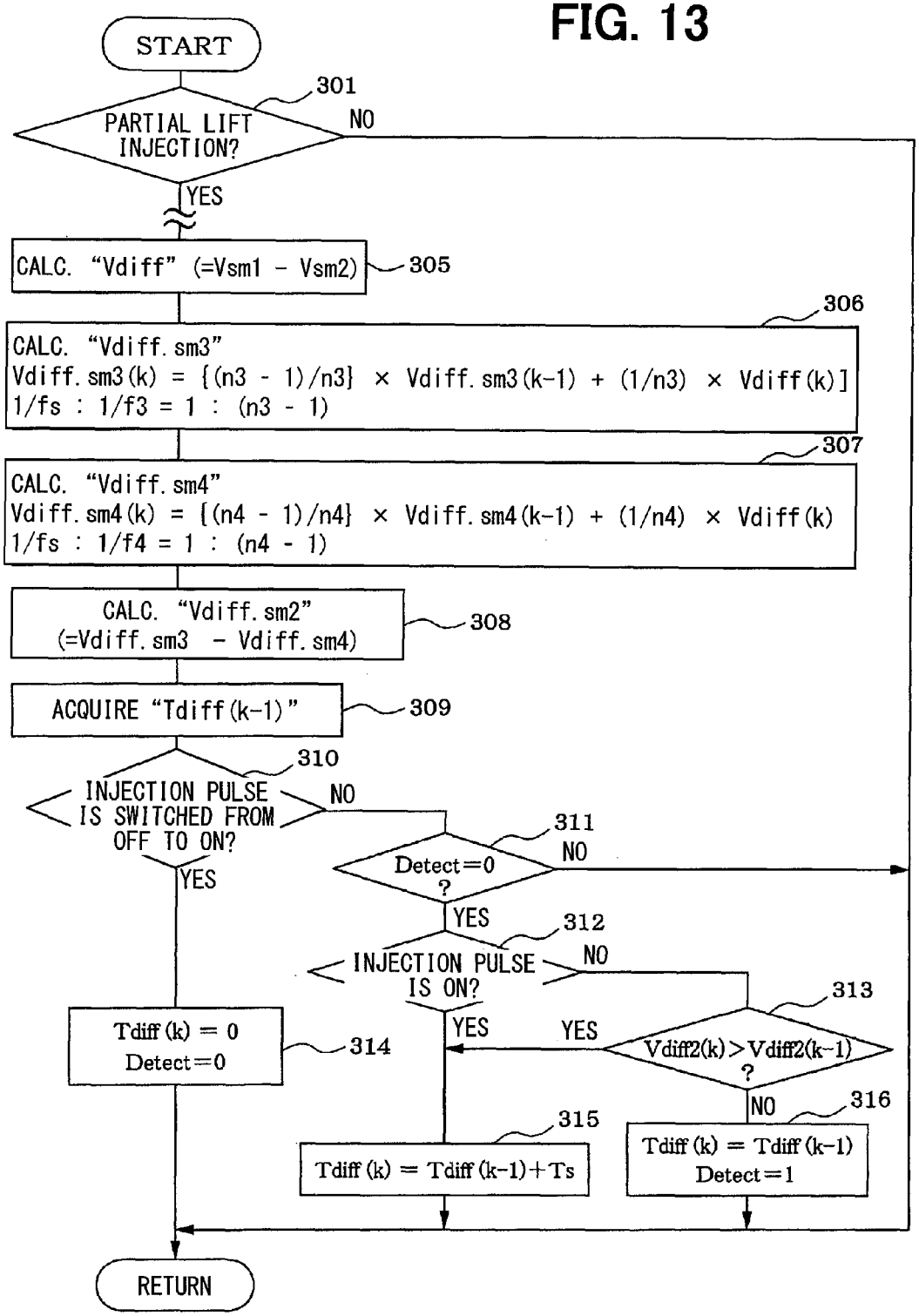
FIG. 13 is a flow chart illustrating a processing of a voltage inflection time calculation routine according to a second embodiment.
Figure 14:
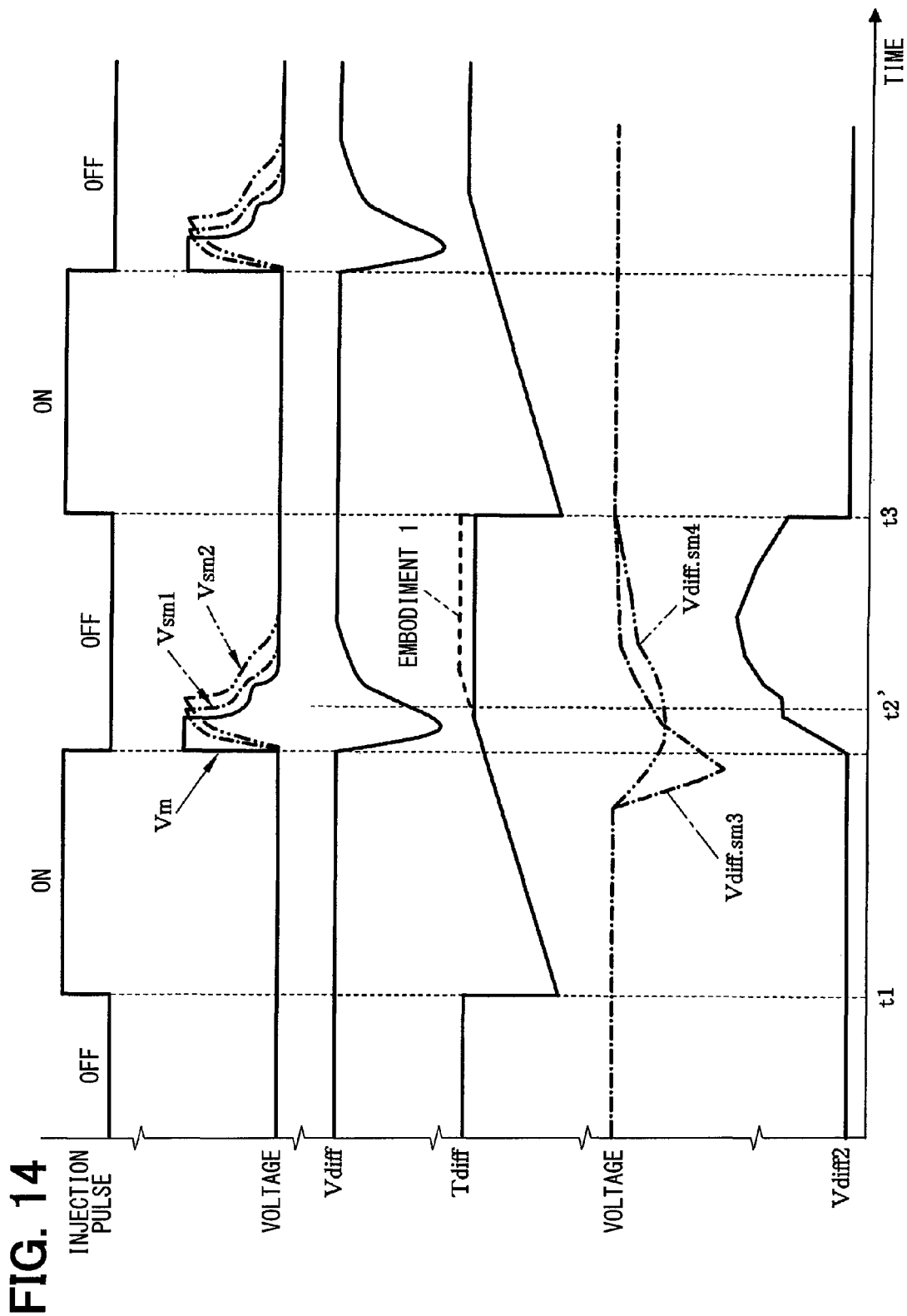
FIG. 14 is a time chart illustrating a voltage inflection time calculation in the second embodiment.

A process of steps 301 to 305 in the routine of FIG. 13 executed in the second embodiment is the same as the process of steps 101 to 105 in the routine of FIG. 10 described in the first embodiment.

In the voltage inflection time calculation routine of FIG. 13, if the partial lift injection is determined to be being performed, a first filtered voltage Vsm1 being a negative terminal voltage Vm of the fuel injection valve 21 filtered by a first low-pass filter is calculated, and a second filtered voltage Vsm2 being the negative terminal voltage Vm of the fuel injection valve 21 filtered by a second low-pass filter is calculated (steps 301 to 304). Subsequently, a difference Vdiff (=Vsm1−Vsm2) between the first filtered voltage Vsm1 and the second filtered voltage Vsm2 is calculated (step 305).

Subsequently, in step 306, there is calculated a third filtered voltage Vdiff.sm3 being the difference Vdiff filtered by a third low-pass filter having a third frequency f3 as a cutoff frequency, the third frequency f3 being lower than a frequency of a noise component (i.e., a low-pass filter having a passband being a frequency band lower than the cutoff frequency f3).

The third low-pass filter is a digital filter implemented by Formula (5) to obtain a current value Vdiff.sm3($k$) of the third filtered voltage using a previous value Vdiff.sm3($k-1$) of the third filtered voltage and a current value Vdiff(k) of the difference.

$$V\text{diff}.sm3(k)=\{(n3-1)/n3\}\times V\text{diff}.sm3(k-1)+(1/n3)\times V\text{diff}(k) \quad (5)$$

The time constant "n3" of the third low-pass filter is set such that the relationship of Formula (6) is satisfied, where "fs" (=1/Ts) is a sampling frequency of the negative terminal voltage Vm, and "f3" is the cutoff frequency of the third low-pass filter.

$$1/fs:1/f3=1:(n3-1) \quad (6)$$

Consequently, it is possible to easily calculate the third filtered voltage Vdiff.sm3 filtered by the third low-pass filter having the third frequency "f3" as the cutoff frequency, the third frequency "f3" being lower than the frequency of the noise component.

Subsequently, in step 307, a fourth filtered voltage Vdiff.sm4 being the difference Vdiff filtered by a fourth low-pass filter having a fourth frequency f4 as a cutoff frequency, the fourth frequency "f4" being lower than the third frequency "f3" (i.e., a low-pass filter having a passband being a frequency band lower than the cutoff frequency f4).

The fourth low-pass filter is a digital filter implemented by Formula (7) to obtain a current value Vdiff.sm4($k$) of the fourth filtered voltage using a previous value Vdiff.sm4($k-1$) of the fourth filtered voltage and the current value Vdiff(k) of the difference.

$$V\text{diff}.sm4(k)=\{(n4-1)/n4\}\times V\text{diff}.sm4(k-1)+(1/n4)\times V\text{diff}(k) \quad (7)$$

The time constant "n4" of the fourth low-pass filter is set such that the relationship of Formula (8) is satisfied, where "fs" (=1/Ts) is the sampling frequency of the negative terminal voltage Vm, and "f4" is the cutoff frequency of the fourth low-pass filter.

$$1/fs:1/f4=1:(n4-1) \quad (8)$$

Consequently, it is possible to easily calculate the fourth filtered voltage Vdiff.sm4 filtered by the fourth low-pass filter having the fourth frequency "f4" as the cutoff frequency, the fourth frequency "f4" being lower than the third frequency "f3".

The cutoff frequency "f3" of the third low-pass filter is set to a frequency higher than the cutoff frequency "f1" of the first low-pass filter, and the cutoff frequency "f4" of the fourth low-pass filter is set to a frequency lower than the cutoff frequency "f2" of the second low-pass filter (i.e., a relationship of f3>f1>f2>f4 is satisfied).

Subsequently, in step 308, a difference between the third filtered voltage Vdiff.sm3 and the fourth filtered voltage Vdiff.sm4 is calculated as the second order differential Vdiff2 (=Vdiff.sm3−Vdiff.sm4), and then the previous value T diff(k−1) of the voltage inflection time is acquired in step 309.

Subsequently, in step 310, whether or not the injection pulse is switched from off to on at the current timing is determined. If the injection pulse is determined to be switched from off to on at the current timing in step 310, then in step 314 a current value Tdiff(k) of the voltage inflection time is reset to "0", and a completion flag Detect is reset to "0".

$$Tdiff(k)=0$$

$$Detect(k)=0$$

If the injection pulse is determined to be switched from off to on at the current timing in step 310, then in step 311 whether or not the completion flag Detect is "0" is determined. If the completion flag Detect is determined to be "0", then in step 312 whether or not the injection pulse is on is determined.

If the injection pulse is determined to be on in step 312, then in step 315 a predetermined value Ts (the calculation period of this routine) is added to the previous value Tdiff(k−1) of the voltage inflection time to obtain the current value Tdiff(k) of the voltage inflection time, so that the voltage inflection time Tdiff is counted up.

$$Tdiff(k)=Tdiff(k-1)+Ts$$

If the injection pulse is determined to be not on (or the injection pulse is off) in step 312, then in step 313 whether or not the second order differential Vdiff2 increases is determined based on whether or not the current value Vdiff2(k) of the second order differential is larger than the previous value Vdiff2(k−1). If the second order differential Vdiff2 no longer increases, the second order differential Vdiff2 is determined to have an extreme value.

If the current value Vdiff2(k) of the second order differential is determined to be larger than the previous value Vdiff2(k−1) (the second order differential Vdiff2 is determined to increase) in step 313, then in step 315 the voltage inflection time Tdiff is continuously counted up.

If the current value Vdiff2(k) of the second order differential is determined to be equal to or smaller than the previous value Vdiff2(k−1) (the second order differential Vdiff2 is determined not to increase) in step 313, calculation of the voltage inflection time Tdiff is determined to be completed, and then in step 316 the current value Tdiff(k) of the voltage inflection time is maintained to the previous value Tdiff(k−1), and the completion flag Detect is set to "1".

$$Tdiff(k)=Tdiff(k-1)$$

$$Detect=1$$

If the completion flag Detect is determined to be 1, while the current value Tdiff(k) of the voltage inflection time is maintained to the previous value Tdiff(k−1), this routine is finished.

Consequently, time from a timing (reference timing), at which the injection pulse is switched from off to on, to a timing, at which the second order differential Vdiff2 has the extreme value (at which the second order differential Vdiff2 no longer increases), is calculated as the voltage inflection time Tdiff, and the calculated value of the voltage inflection time Tdiff is maintained until the next reference timing.

An execution example of calculation of the voltage inflection time in the second embodiment is now described with reference to a time chart of FIG. 14.

During the partial lift injection (at least after off of the injection pulse of the partial lift injection), the first filtered voltage Vsm1 and the second filtered voltage Vsm2 are calculated, and the difference Vdiff between the first filtered voltage Vsm1 and the second filtered voltage Vsm2 is calculated.

Furthermore, the third filtered voltage Vdiff.sm3 being the difference Vdiff filtered by the third low-pass filter is calculated, and the fourth filtered voltage Vdiff.sm4 being the difference Vdiff filtered by the fourth low-pass filter is calculated. In addition, a difference between the third filtered voltage Vdiff.sm3 and the fourth filtered voltage Vdiff.sm4 is calculated as a second order differential Vdiff2 (=Vdiff.sm3−Vdiff.sm4).

The voltage inflection time Tdiff is reset to "0" at a timing (reference timing) t1 when the injection pulse is switched from off to on, and then calculation of the voltage inflection time Tdiff is started, and the voltage inflection time Tdiff is repeatedly counted up with the predetermined calculation period Ts.

Subsequently, the calculation of the voltage inflection time Tdiff is completed at a timing t2' when the second order differential Vdiff2 has an extreme value (the second order differential Vdiff2 no longer increases) after off of the injection pulse. Consequently, time from the timing (reference timing) t1, at which the injection pulse is switched from off to on, to the timing t2', at which the second order differential Vdiff2 has an extreme value, is calculated as the voltage inflection time Tdiff.

The calculated value of the voltage inflection time Tdiff is maintained until the next reference timing t3, during which (during a period from the calculation completion timing t2' of the voltage inflection time Tdiff to the next reference timing t3) the engine control microcomputer 35 acquires the voltage inflection time Tdiff from the injector drive IC 36.

In the second embodiment, the third filtered voltage Vdiff.sm3 being the difference Vdiff filtered by the third low-pass filter is calculated, and the fourth filtered voltage Vdiff.sm4 being the difference Vdiff filtered by the fourth low-pass filter is calculated. In addition, the difference between the third filtered voltage Vdiff.sm3 and the fourth filtered voltage Vdiff.sm4 is calculated as the second order differential Vdiff2. The voltage inflection time Tdiff is calculated with the timing, at which the second order differential Vdiff2 has an extreme value (the second order differential Vdiff2 no longer increases), as a timing when the difference Vdiff has an inflection point. Consequently, it is possible to accurately calculate the voltage inflection time Tdiff that varies depending on the valve-closing timing of the fuel injection valve 21, and prevent the voltage inflection time Tdiff from being affected by offset of a terminal voltage waveform due to circuit variations.

Third Embodiment

A third embodiment of the disclosure is now described with reference to FIGS. 15 and 16. However, portions substantially the same as those in the first embodiment are not or briefly described, and differences from the first embodiment are mainly described.

In the first embodiment, the voltage inflection time Tdiff is calculated with the reference timing being the timing when the injection pulse of the partial lift injection is switched from off to on. In the third embodiment, the ECU 30 executes a voltage inflection time calculation routine of FIG. 15 described later to calculate the voltage inflection time Tdiff with a reference timing being a timing when the injection pulse of the partial lift injection is switched from on to off.

Figure 15:
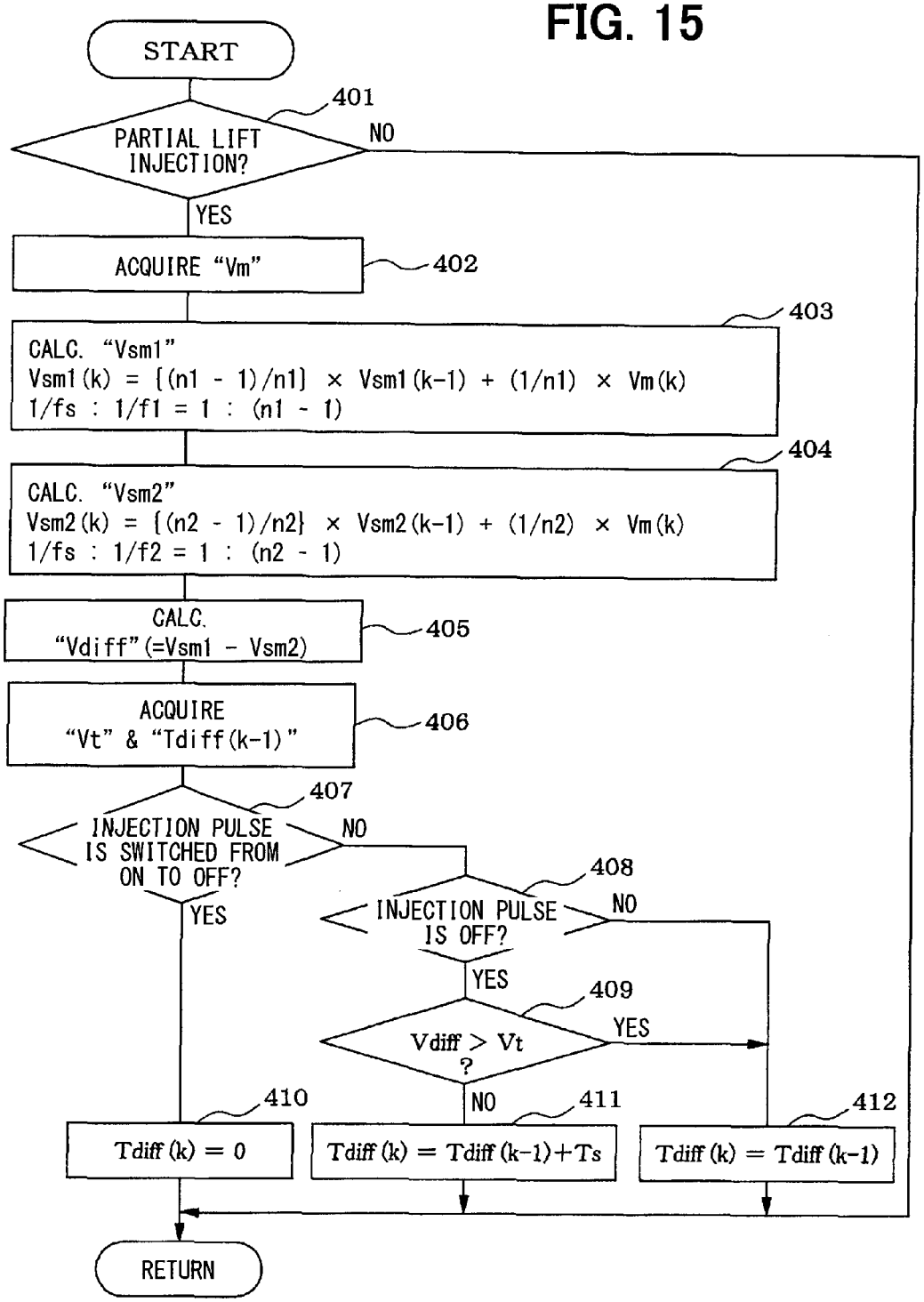
FIG. 15 is a flow chart illustrating a processing of a voltage inflection time calculation routine according to a third embodiment.

A process of steps 401 to 406 in the routine of FIG. 15 executed in the third embodiment is the same as the process of steps 101 to 106 in the routine of FIG. 10 described in the first embodiment.

In the voltage inflection time calculation routine of FIG. 15, if the partial lift injection is determined to be being performed, a first filtered voltage Vsm1 being a negative terminal voltage Vm of the fuel injection valve 21 filtered by a first low-pass filter is calculated, and a second filtered voltage Vsm2 being the negative terminal voltage Vm of the fuel injection valve 21 filtered by a second low-pass filter is calculated (steps 401 to 404).

Subsequently, a difference Vdiff between the first filtered voltage Vsm1 and the second filtered voltage Vsm2 is calculated, and then a threshold Vt and a previous value Tdiff(k−1) of the voltage inflection time are acquired (steps 405, 406).

Subsequently, in step 407, whether or not the injection pulse is switched from on to off at the current timing is determined. If the injection pulse is determined to be switched from on to off at the current timing in step 407, then in step 410 a current value Tdiff(k) of the voltage inflection time is reset to "0".

$T\text{diff}(k)=0$

If the injection pulse is determined to be switched from on to off at the current timing in step 407, then in step 408 whether or not the injection pulse is off is determined. If the injection pulse is determined to be off in step 408, then in step 409 whether or not the difference Vdiff between the first filtered voltage Vsm1 and the second filtered voltage Vsm2 exceeds the threshold Vt (whether or not the difference Vdiff inversely becomes larger than the threshold Vt) is determined.

If the difference Vdiff between the first filtered voltage Vsm1 and the second filtered voltage Vsm2 is determined not to exceed the threshold Vt in step 409, then in step 411 a predetermined value Ts (the calculation period of this routine) is added to the previous value Tdiff(k−1) of the voltage inflection time to obtain the current value Tdiff(k) of the voltage inflection time, so that the voltage inflection time Tdiff is counted up.

$T\text{diff}(k)=T\text{diff}(k-1)+Ts$

If the difference Vdiff between the first filtered voltage Vsm1 and the second filtered voltage Vsm2 is determined to exceed the threshold Vt in step 409, calculation of the voltage inflection time Tdiff is determined to be completed, and in step 412 the current value Tdiff(k) of the voltage inflection time is maintained to the previous value Tdiff(k−1).

$T\text{diff}(k)=T\text{diff}(k-1)$

Consequently, time from the timing (reference timing), at which the injection pulse is switched from on to off, to the timing, at which the difference Vdiff exceeds the threshold Vt, is calculated as the voltage inflection time Tdiff.

If the injection pulse is determined to be not off (i.e., the injection pulse is on) in step 408, the current value Tdiff(k) of the voltage inflection time is continuously maintained to the previous value Tdiff(k−1), and the calculated value of the voltage inflection time Tdiff is maintained until the next reference timing.

An execution example of calculation of the voltage inflection time in the third embodiment is now described with reference to a time chart of FIG. 16.

During the partial lift injection (at least after off of the injection pulse of the partial lift injection), the first filtered voltage Vsm1 and the second filtered voltage Vsm2 are calculated, and the difference Vdiff between the first filtered voltage Vsm1 and the second filtered voltage Vsm2 is calculated.

The voltage inflection time Tdiff is reset to "0" at a timing (reference timing) t4 when the injection pulse is switched from on to off, and then calculation of the voltage inflection time Tdiff is started, and the voltage inflection time Tdiff is repeatedly counted up with the predetermined calculation period Ts.

The calculation of the voltage inflection time Tdiff is completed at a timing t5 when the difference Vdiff between the first filtered voltage Vsm1 and the second filtered voltage Vsm2 exceeds the threshold Vt after off of the injection pulse. Consequently, time from the timing (reference timing) t4, at which the injection pulse is switched from on to off, to the timing t5, at which the difference Vdiff exceeds the threshold Vt, is calculated as the voltage inflection time Tdiff.

The calculated value of the voltage inflection time Tdiff is maintained until the next reference timing t6, during which (during a period from the calculation completion timing t5 of the voltage inflection time Tdiff to the next reference timing t6), the engine control microcomputer 35 acquires the voltage inflection time Tdiff from the injector drive IC 36.

In the third embodiment, the voltage inflection time Tdiff is calculated with the reference timing being the timing when the injection pulse of the partial lift injection is switched from on to off; hence, the voltage inflection time Tdiff can be accurately calculated with reference to the timing when the injection pulse is switched from on to off. Moreover, a period during which the calculated value of the voltage inflection time Tdiff is maintained can be lengthened compared with the case where the timing when the injection pulse is switched from off to on is used as a reference timing (first embodiment), so that the period during which the engine control microcomputer 35 can acquire the voltage inflection time Tdiff can be further lengthened.

In the third embodiment, time from the timing, at which the injection pulse is switched from off to on, to the timing, at which the difference Vdiff exceeds the threshold Vt, is calculated as the voltage inflection time Tdiff. However, time from the timing, at which the injection pulse is switched from off to on, to the timing, at which the second order differential Vdiff2 has an extreme value, may be calculated as the voltage inflection time Tdiff.

Fourth Embodiment

A fourth embodiment of the disclosure is now described with reference to FIGS. 17 and 18. However, portions substantially the same as those in the first embodiment are not or briefly described, and differences from the first embodiment are mainly described.

In the first embodiment, the voltage inflection time Tdiff is calculated with the reference timing being the timing when the injection pulse of the partial lift injection is switched from off to on. In the fourth embodiment, the ECU 30 executes a voltage inflection time calculation routine of FIG. 17 described later, so that the voltage inflection time Tdiff is calculated with a reference timing being a timing when the negative terminal voltage Vm of the fuel injection valve 21 becomes lower than a predetermined value Voff after off of the injection pulse of the partial lift injection.

Figure 17:
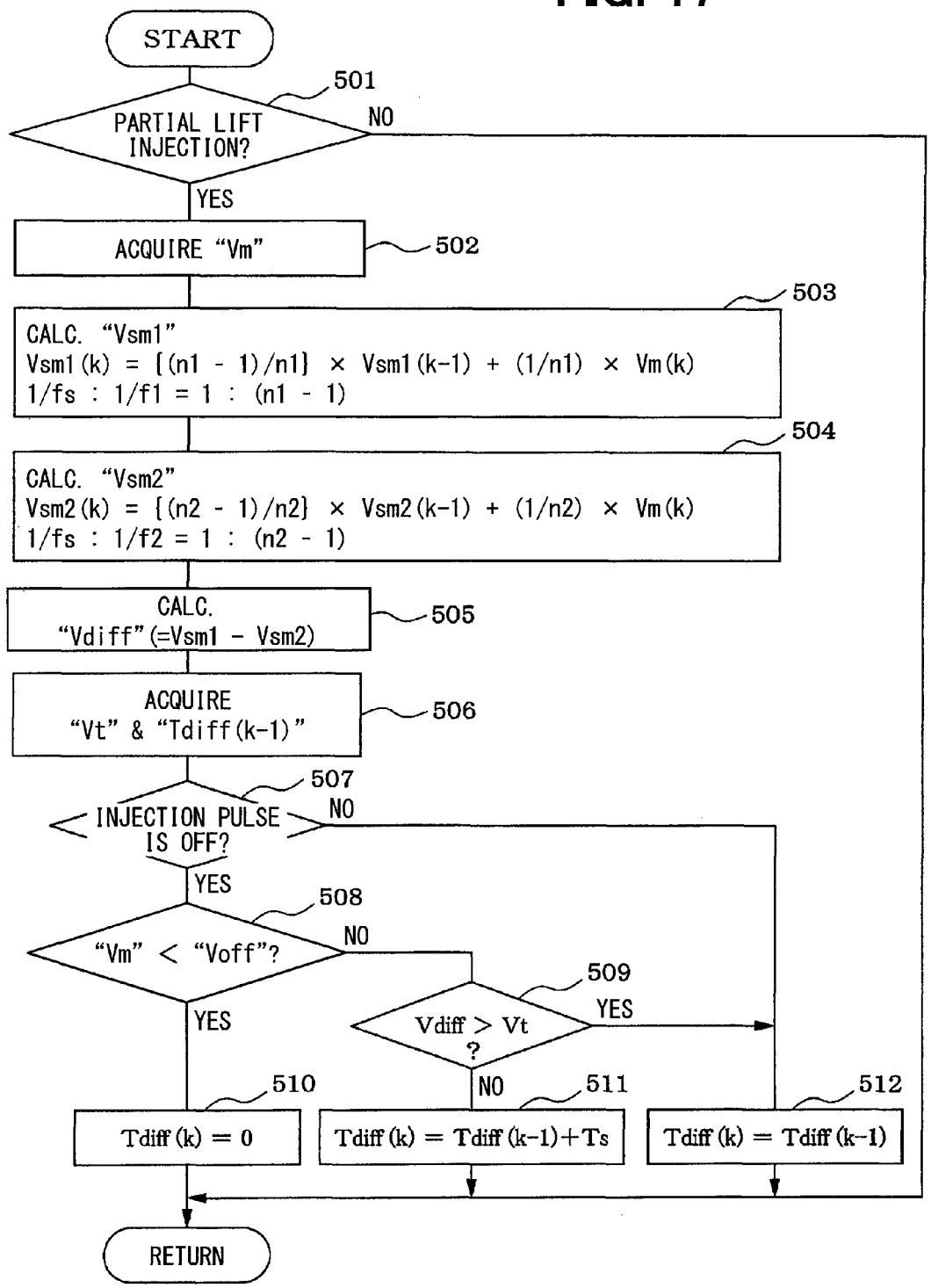
FIG. 17 is a flow chart illustrating a processing of a voltage inflection time calculation routine according to a fourth embodiment.
Figure 18:
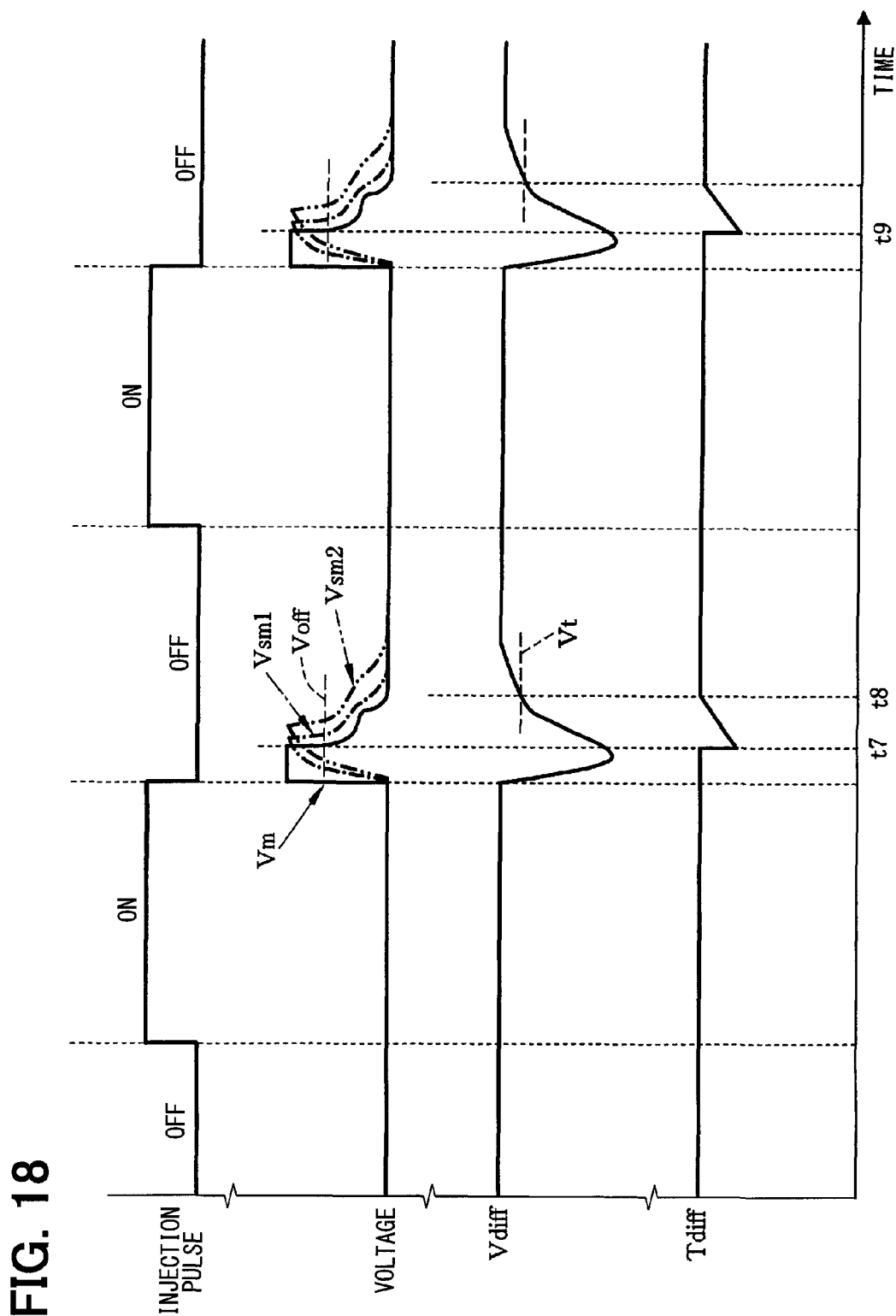
FIG. 18 is a time chart illustrating a voltage inflection time calculation in the fourth embodiment.

A process of steps 501 to 506 in the routine of FIG. 17 executed in the fourth embodiment is the same as the process of steps 101 to 106 in the routine of FIG. 10 described in the first embodiment.

In the voltage inflection time calculation routine of FIG. 17, if the partial lift injection is determined to be being performed, a first filtered voltage Vsm1 being a negative terminal voltage Vm of the fuel injection valve 21 filtered by a first low-pass filter is calculated, and a second filtered voltage Vsm2 being the negative terminal voltage Vm of the fuel injection valve 21 filtered by a second low-pass filter is calculated (steps 501 to 504).

Subsequently, a difference Vdiff between the first filtered voltage Vsm1 and the second filtered voltage Vsm2 is calculated, and then a threshold Vt and a previous value Tdiff(k−1) of the voltage inflection time are acquired (steps 505, 506).

Subsequently, in step 507, whether or not the injection pulse is off is determined. If the injection pulse is determined to be off in step 507, then in step 508 whether or not the negative terminal voltage Vm of the fuel injection valve 21 becomes lower than a predetermined value Voff (inversely becomes smaller than the predetermined value Voff) at the current timing is determined.

If the negative terminal voltage Vm of the fuel injection valve 21 is determined to become lower than the predetermined value Voff at the current timing in step 508, then in step 510 a current value Tdiff(k) of the voltage inflection time is reset to "0".

$$Tdiff(k)=0$$

If the negative terminal voltage Vm of the fuel injection valve 21 is determined not to become lower than the predetermined value Voff at the current timing in step 508, then in step 509 whether or not the difference Vdiff between the first filtered voltage Vsm1 and the second filtered voltage Vsm2 exceeds the threshold Vt (whether or not the difference Vdiff inversely becomes larger than the threshold Vt) is determined.

If the difference Vdiff between the first filtered voltage Vsm1 and the second filtered voltage Vsm2 is determined not to exceed the threshold Vt in step 509, then in step 511 a predetermined value Ts (the calculation period of this routine) is added to the previous value Tdiff(k−1) of the voltage inflection time to obtain a current value Tdiff(k) of the voltage inflection time, so that the voltage inflection time Tdiff is counted up.

$$Tdiff(k)=Tdiff(k-1)+Ts$$

If the difference Vdiff between the first filtered voltage Vsm1 and the second filtered voltage Vsm2 is determined to exceed the threshold Vt in step 509, calculation of the voltage inflection time Tdiff is determined to be completed, and in step 512 the current value Tdiff(k) of the voltage inflection time is maintained to the previous value Tdiff(k−1).

$$Tdiff(k)=Tdiff(k-1)$$

Consequently, time from the timing (reference timing), at which the negative terminal voltage Vm of the fuel injection valve 21 becomes lower than the predetermined value Voff after off of the injection pulse, to the timing, at which the difference Vdiff exceeds the threshold Vt, is calculated as the voltage inflection time Tdiff.

If the injection pulse is determined to be not off (i.e., the injection pulse is on) in step 507, the current value Tdiff(k) of the voltage inflection time is continuously maintained to the previous value Tdiff(k−1), and the calculated value of the voltage inflection time Tdiff is maintained until the next reference timing.

An execution example of calculation of the voltage inflection time in the fourth embodiment is now described with reference to a time chart of FIG. 18.

During the partial lift injection (at least after off of the injection pulse of the partial lift injection), the first filtered voltage Vsm1 and the second filtered voltage Vsm2 are calculated, and the difference Vdiff between the first filtered voltage Vsm1 and the second filtered voltage Vsm2 is calculated.

The voltage inflection time Tdiff is reset to "0" at a timing (reference timing) t7 when the negative terminal voltage Vm of the fuel injection valve 21 becomes lower than the predetermined value Voff after off of the injection pulse, and then calculation of the voltage inflection time Tdiff is started, and the voltage inflection time Tdiff is repeatedly counted up with the predetermined calculation period Ts.

The calculation of the voltage inflection time Tdiff is completed at a timing t8 when the difference Vdiff between the first filtered voltage Vsm1 and the second filtered voltage Vsm2 exceeds the threshold Vt after off of the injection pulse. Consequently, time from the timing (reference timing) t7, at which the negative terminal voltage Vm of the fuel injection valve 21 becomes lower than the predetermined value Voff after off of the injection pulse, to the timing t8, at which the difference Vdiff exceeds the threshold Vt, is calculated as the voltage inflection time Tdiff.

The calculated value of the voltage inflection time Tdiff is maintained until the next reference timing t9, during which (during a period from the calculation completion timing t8 of the voltage inflection time Tdiff to the next reference timing t9), the engine control microcomputer 35 acquires the voltage inflection time Tdiff from the injector drive IC 36.

In the fourth embodiment, the voltage inflection time Tdiff is calculated with the reference timing being the timing when the negative terminal voltage Vm of the fuel injection valve 21 becomes lower than the predetermined value Voff after off of the injection pulse of the partial lift injection; hence, the voltage inflection time Tdiff can be accurately calculated with reference to the timing when the negative terminal voltage Vm of the fuel injection valve 21 becomes lower than the predetermined value Voff after off of the injection pulse. Moreover, a period during which the calculated value of the voltage inflection time Tdiff is maintained can be lengthened compared with the case where the timing when the injection pulse is switched from off to on is used as the reference timing (first embodiment), so that the period during which the engine control microcomputer 35 can acquire the voltage inflection time Tdiff can be further lengthened.

In the fourth embodiment, time from the timing, at which the negative terminal voltage Vm becomes lower than the predetermined value Voff, to the timing, at which the difference Vdiff exceeds the threshold Vt, is calculated as the voltage inflection time Tdiff. However, time from the timing, at which the negative terminal voltage Vm becomes lower than the predetermined value Voff, to the timing, at which the second order differential Vdiff2 has an extreme value, may be calculated as the voltage inflection time Tdiff.

Fifth Embodiment

A fifth embodiment of the disclosure is now described with reference to FIG. 19. However, portions substantially the same as those in the first embodiment are not or briefly described, and differences from the first embodiment are mainly described.

Figure 19:
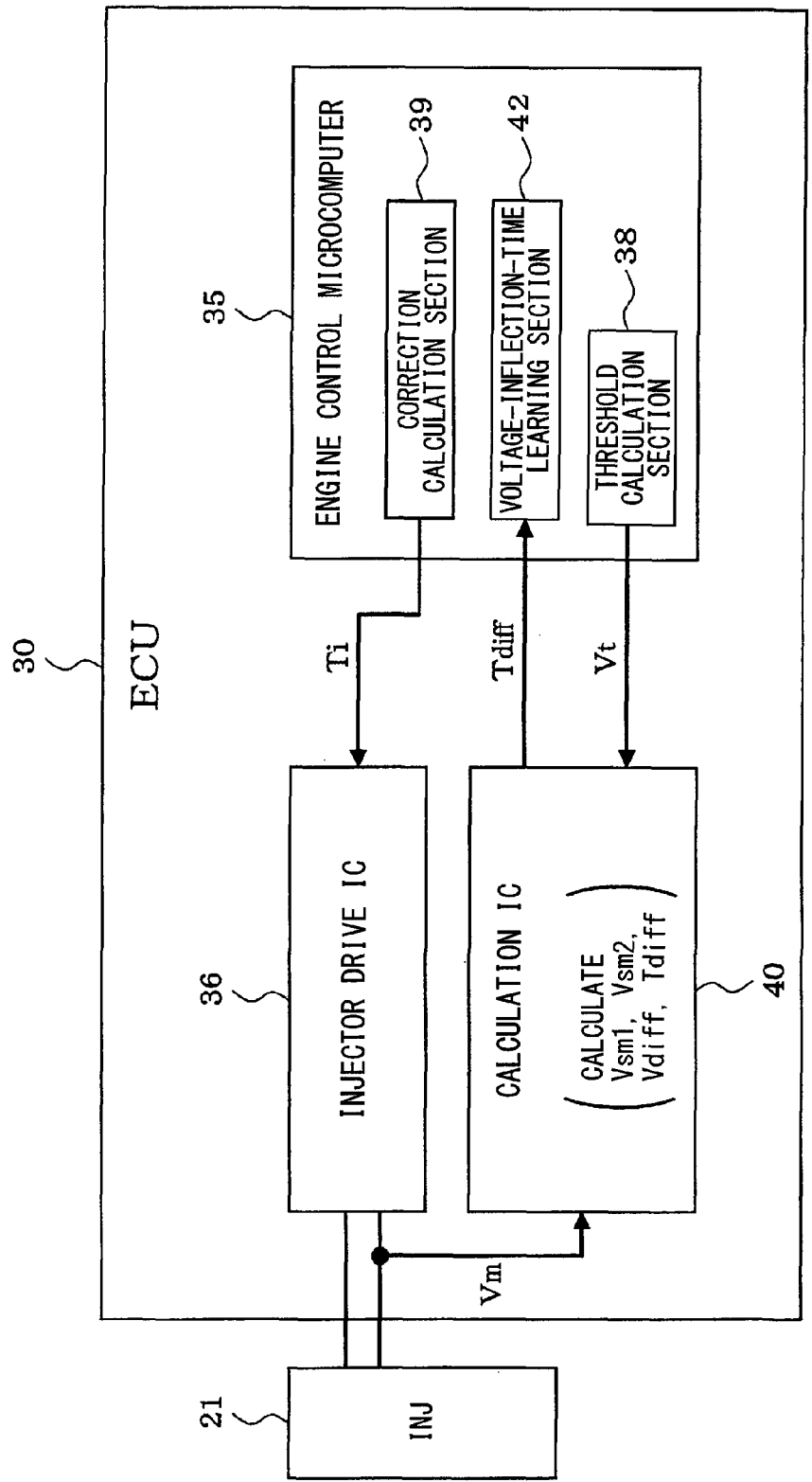
FIG. 19 is a block diagram illustrating a configuration of ECU according to a fifth embodiment.

In the fifth embodiment, as shown in FIG. 19, the ECU 30 has a calculation IC 40 besides the injector drive IC 36. The calculation IC 40 computes the first filtered voltage Vsm1 and the second filtered voltage Vsm2 while the partial-lift injection is performed. Furthermore, the calculation IC 40 computes the difference Vdiff and the voltage inflection time Tdiff.

Alternatively, the calculation IC 40 computes the third filtered voltage Vdiff.sm3 and the fourth filtered voltage Vdiff.sm4. Furthermore, the calculation IC 40 may computes the second order differential Vdiff2 and the voltage inflection time Tdiff.

In this case, the calculation IC 40 corresponds to a filtered-voltage acquisition portion, a difference calculation portion and a time calculation portion.

In the fifth embodiment, since the calculation IC 40 functions as the filtered-voltage acquisition portion, the difference calculation portion and a time calculation portion, an arithmetic load of the engine control microcomputer 35 can be reduced.

Sixth Embodiment

A sixth embodiment of the disclosure is now described with reference to FIG. 20. However, portions substantially the same as those in the first embodiment are not or briefly described, and differences from the first embodiment are mainly described.

Figure 20:
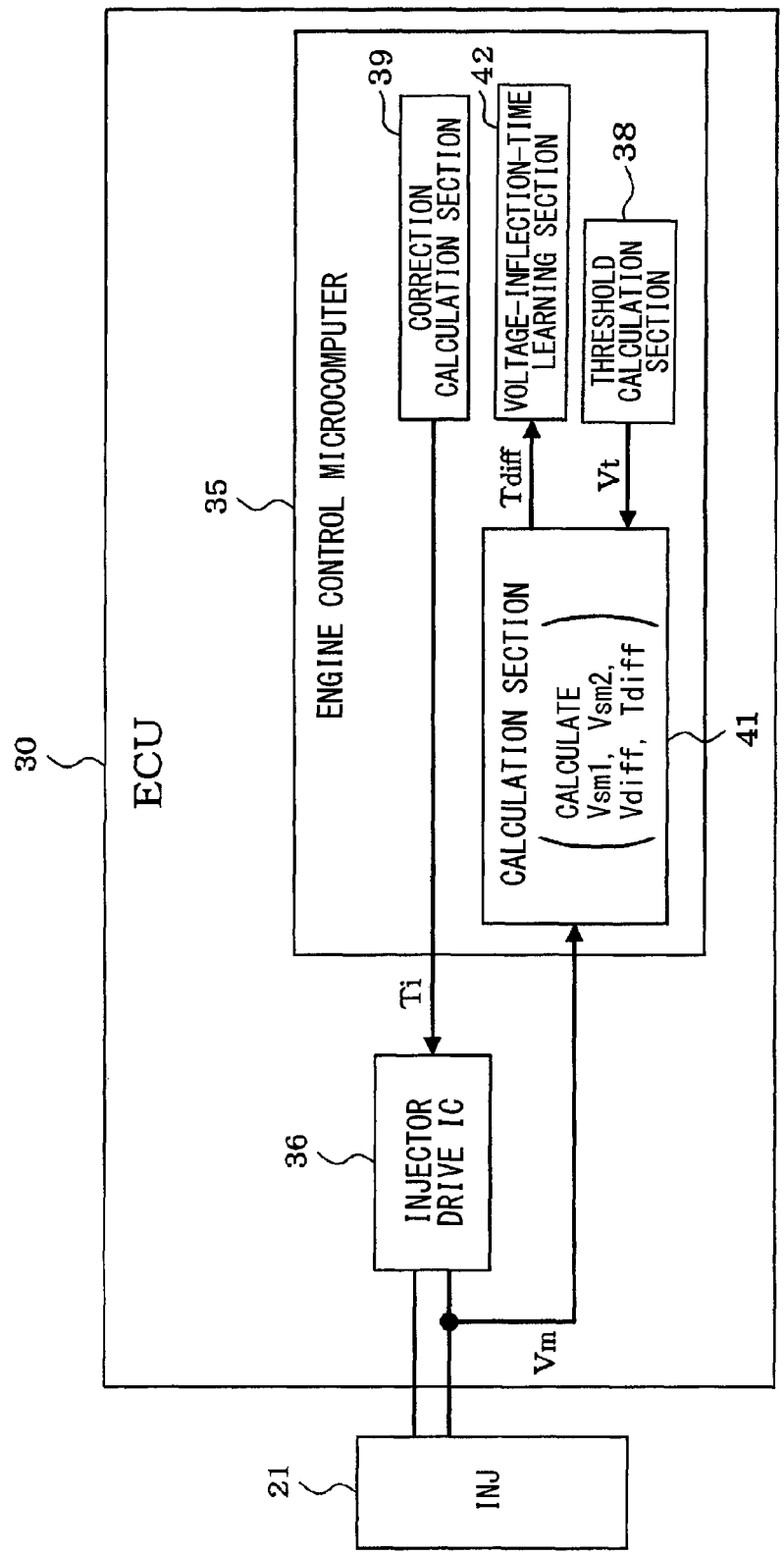
FIG. 20 is a block diagram illustrating a configuration of ECU according to a sixth embodiment.

In the sixth embodiment, as shown in FIG. 20, a calculation section 41 of the engine control microcomputer 35 computes the first filtered voltage Vsm1 and the second filtered voltage Vsm2 while the partial-lift injection is performed. Furthermore, the calculation section 41 computes the difference Vdiff and the voltage inflection time Tdiff.

Alternatively, the calculation section 41 computes the third filtered voltage Vdiff.sm3 and the fourth filtered voltage Vdiff.sm4. Furthermore, the calculation section 41 computes the difference Vdiff2 and the voltage inflection time Tdiff.

In this case, the calculation section 41 of the corresponds to a filtered-voltage acquisition portion, a difference calculation portion and a time calculation portion.

In the sixth embodiment, since the engine control microcomputer 35 (calculation section 41) functions as the filtered-voltage acquisition portion, the difference calculation portion and a time calculation portion, these function can be performed by changing a specification of the engine control microcomputer 35.

In the above embodiments, the voltage inflection time Tdiff is computed while the partial lift injection is performed. However, the voltage inflection time Tdiff may be computed when a specified condition is established while the partial lift injection is performed.

Although a digital filter is used as each of the first to fourth low-pass filters in the first to tenth embodiments, this is not limitative, and an analog filter may be used as such a low-pass filter.

Although a negative terminal voltage of the fuel injection valve 21 is used to calculate the voltage inflection time in the first to tenth embodiments, this is not limitative, and a positive terminal voltage of the fuel injection valve 21 may be used to calculate the voltage inflection time.

In addition, the disclosure may be practically applied to a system having a fuel injection valve for intake port injection without being limited to the system having the fuel injection valve for in-cylinder injection.

Although the disclosure has been described with some embodiments, it will be understood that the disclosure is not limited to the embodiments and the relevant structures. The disclosure includes various modifications and various transformations within the equivalent scope. In addition, various combinations and modes, and other combinations and modes containing at least or at most one component added thereto are also contained within the category or the scope of the technical idea of the disclosure.

The invention claimed is:

1. A fuel injection control system of an internal combustion engine having an electromagnetic driving fuel injection valve, the fuel injection control system comprising:
    an injection control portion that performs partial lift injection to drive a fuel injection valve to open with an injection pulse allowing a lift amount of a valve element of the fuel injection valve not to reach a full lift position;
    a filtered-voltage acquisition portion that, after off of an injection pulse of the partial lift injection, acquires a first filtered voltage being a terminal voltage of the fuel injection valve filtered by a first low-pass filter having a first frequency as a cutoff frequency, the first frequency being lower than a frequency of a noise component, and acquires a second filtered voltage being the terminal voltage filtered by a second low-pass filter having a second frequency as a cutoff frequency, the second frequency being lower than the first frequency;
    a difference calculation portion that calculates a difference between the first filtered voltage and the second filtered voltage;
    a time calculation portion that calculates time from a predetermined reference timing to a timing when the difference has an inflection point as voltage inflection time;
    a learning portion that obtains an averaged value of a predetermined frequency of data of the voltage inflection time as a learning value of the voltage inflection time; and
    an injection pulse correction portion that corrects the injection pulse of the partial lift injection based on the learning value of the voltage inflection time.

2. The fuel injection control system of the internal combustion engine according to claim 1, wherein the learning portion counts up a normal counter when the voltage inflection time is within a predetermined normal range, and counts up an abnormal counter while using no voltage inflection time for the averaging when the voltage inflection time is outside the normal range.

3. The fuel injection control system of the internal combustion engine according to claim 2, wherein the learning portion performs the averaging when a count value of the normal counter arrives at the predetermined frequency.

4. The fuel injection control system of the internal combustion engine according to claim 2, wherein the normal counter is set for each of cylinders, and
wherein the abnormal counter is set in common for all the cylinders.

5. The fuel injection control system of the internal combustion engine according to claim 2, wherein when a count value of the abnormal counter exceeds a predetermined abnormal determination frequency, the learning portion determines an anomaly exists in a circuit serving as at least one of the filtered-voltage acquisition portion, the difference calculation portion, and the time calculation portion, and prohibits correction of the injection pulse based on the learning value of the voltage inflection time.

6. The fuel injection control system of the internal combustion engine according to claim 5, wherein the abnormal determination frequency is set to a value larger than the predetermined frequency.

7. The fuel injection control system of the internal combustion engine according to claim 2, wherein the normal range is set based on an upper limit and a lower limit of the voltage inflection time calculated when a variation in quality of each of the circuit and the fuel injection valve is within an allowable range, the circuit serving as at least one of the filtered-voltage acquisition portion, the difference calculation portion, and the time calculation means portion.

8. The fuel injection control system of the internal combustion engine according to claim 1, wherein the time calculation portion calculates the voltage inflection time with a timing when the difference exceeds a predetermined threshold as the timing when the difference has the inflection point.

9. The fuel injection control system of the internal combustion engine according to claim 1,
wherein the filtered-voltage acquisition portion acquires a third filtered voltage being the difference filtered by a third low-pass filter having a third frequency as a cutoff frequency, the third frequency being lower than a frequency of a noise component, and acquires a fourth filtered voltage being the difference filtered by a fourth low-pass filter having a fourth frequency as the cutoff frequency, the fourth frequency being lower than the third frequency,
wherein the difference calculation portion calculates a difference between the third filtered voltage and the fourth filtered voltage as a second order differential, and
wherein the time calculation portion calculates the voltage inflection time with a timing when the second order differential has an extreme value as the timing when the difference has the inflection point.

10. The fuel injection control system of the internal combustion engine according to claim 9, wherein when the second order differential no longer increases, the time calculation portion determines the second order differential has the extreme value.

* * * * *